(12) United States Patent
Xue et al.

(10) Patent No.: US 12,256,151 B2
(45) Date of Patent: Mar. 18, 2025

(54) METHODS AND SYSTEMS FOR USER ADJUSTABLE REGION BASED BRIGHTNESS SETTINGS

(71) Applicant: Google LLC, Mountain View, CA (US)

(72) Inventors: Tianfan Xue, Sunnyvale, CA (US); Samuel William Hasinoff, Sunnyvale, CA (US); Rachit Gupta, Seattle, WA (US)

(73) Assignee: Google LLC, Mountain View, CA (US)

( * ) Notice: Subject to any disclaimer, the term of this patent is extended or adjusted under 35 U.S.C. 154(b) by 185 days.

(21) Appl. No.: 17/704,275

(22) Filed: Mar. 25, 2022

(65) Prior Publication Data

US 2023/0308769 A1    Sep. 28, 2023

(51) Int. Cl.
*G06T 7/11* (2017.01)
*G06F 3/04842* (2022.01)
(Continued)

(52) U.S. Cl.
CPC ......... *H04N 23/73* (2023.01); *G06F 3/04842* (2013.01); *G06F 3/04847* (2013.01); *G06T 7/11* (2017.01); *G06V 10/70* (2022.01); *G06V 20/70* (2022.01); *G06V 40/10* (2022.01); *H04N 23/741* (2023.01); *G06T 2200/24* (2013.01); *G06T 2207/10016* (2013.01); *G06T 2207/20081* (2013.01); *G06T 2207/20084* (2013.01);
(Continued)

(58) Field of Classification Search
CPC .. H04N 23/631; H04N 23/632; H04N 23/633; H04N 23/635; G06T 7/10; G06T 7/194

USPC ...................................................... 348/333.01
See application file for complete search history.

(56) References Cited

U.S. PATENT DOCUMENTS

| | | | | |
|---|---|---|---|---|
| 2012/0050565 A1* | 3/2012 | Imai | ........................ | H04N 25/11 348/E9.052 |
| 2014/0223376 A1* | 8/2014 | Tarvainen | .............. | G06F 3/0486 715/833 |

(Continued)

FOREIGN PATENT DOCUMENTS

| | | | | |
|---|---|---|---|---|
| CN | 110634147 A | * | 12/2019 | ........... G06T 3/0012 |
| WO | WO-2020068158 A1 | * | 4/2020 | ............. G06T 5/008 |
| WO | WO-2021034311 A1 | * | 2/2021 | ........... H04N 23/631 |

OTHER PUBLICATIONS

Chen et al., "Real-time Edge-Aware Image Processing with the Bilateral Grid," 2007, Massachusetts Institute of Technology. (Year: 2007).*

(Continued)

*Primary Examiner* — Anthony J Daniels
(74) *Attorney, Agent, or Firm* — McDonnell Boehnen Hulbert & Berghoff LLP

(57) ABSTRACT

An example method includes displaying, by a graphical user interface of a computing device, an image comprising a target region. The target region may be smaller than an entirety of the image. The method includes providing, by the graphical user interface, a user-adjustable control to adjust a desired local brightness exposure level for the target region. The method includes receiving, by the user-adjustable control, a user indication of the desired local brightness exposure level for the target region. The method includes adjusting the local brightness exposure level for the target region in the image in response to the user indication.

20 Claims, 15 Drawing Sheets

(51) Int. Cl.
  *G06F 3/04847* (2022.01)
  *G06V 10/70* (2022.01)
  *G06V 20/70* (2022.01)
  *G06V 40/10* (2022.01)
  *H04N 23/63* (2023.01)
  *H04N 23/73* (2023.01)
  *H04N 23/741* (2023.01)

(52) U.S. Cl.
  CPC ............... *G06T 2207/20104* (2013.01); *G06T 2207/30196* (2013.01)

(56) References Cited

U.S. PATENT DOCUMENTS

| | | | | |
|---|---|---|---|---|
| 2015/0350533 | A1* | 12/2015 | Harris | H04N 23/73 348/362 |
| 2021/0264576 | A1 | 8/2021 | Sun | |
| 2022/0382440 | A1* | 12/2022 | Manzari | G06F 3/04847 |
| 2023/0146181 | A1* | 5/2023 | Meshkin | G06F 18/214 382/274 |

OTHER PUBLICATIONS

Ronneberger et al., "U-Net: Convolutional Networks for Biomedical Image Segmentation", http://lmb.informatik.uni-freiburg.de (2015).

Gharbi et al., "Deep Bilateral Learning for Real-Time Image Enhancement", ACM Trans. Graph, 34, 4 Article 118 (2017).

Senzer, "A new, more helpful editor in Google Photos", https://blog.google/products/photos/new-helpful-editor (retrieved Mar. 4, 2022).

Liang et al., "An Auto-exposure Algorithm for Detecting High Contrast Lighting Conditions", 2007 7th International Conference on ASIC, pp. 725-728, IEEE, Oct. 22-25, 2007 https://ieeexplore.ieee.org/document/4415733.

Cho et al., "Fast auto-exposure algorithm based on numerical analysis", Proceedings vol. 3650, Sensors, Cameras, and Applications for Digital Photography, pp. 93-99; (1999) https://www.spiedigitallibrary.org/conference-proceedings-of-spie/3650/0000/Fast-auto-exposure-algorithm-based-on-numerical-analysis/10.1117/12.342853.short?msclkid=a9b0f1c0aeb511ec8bbb962f14f8641b&SSO=1.

\* cited by examiner

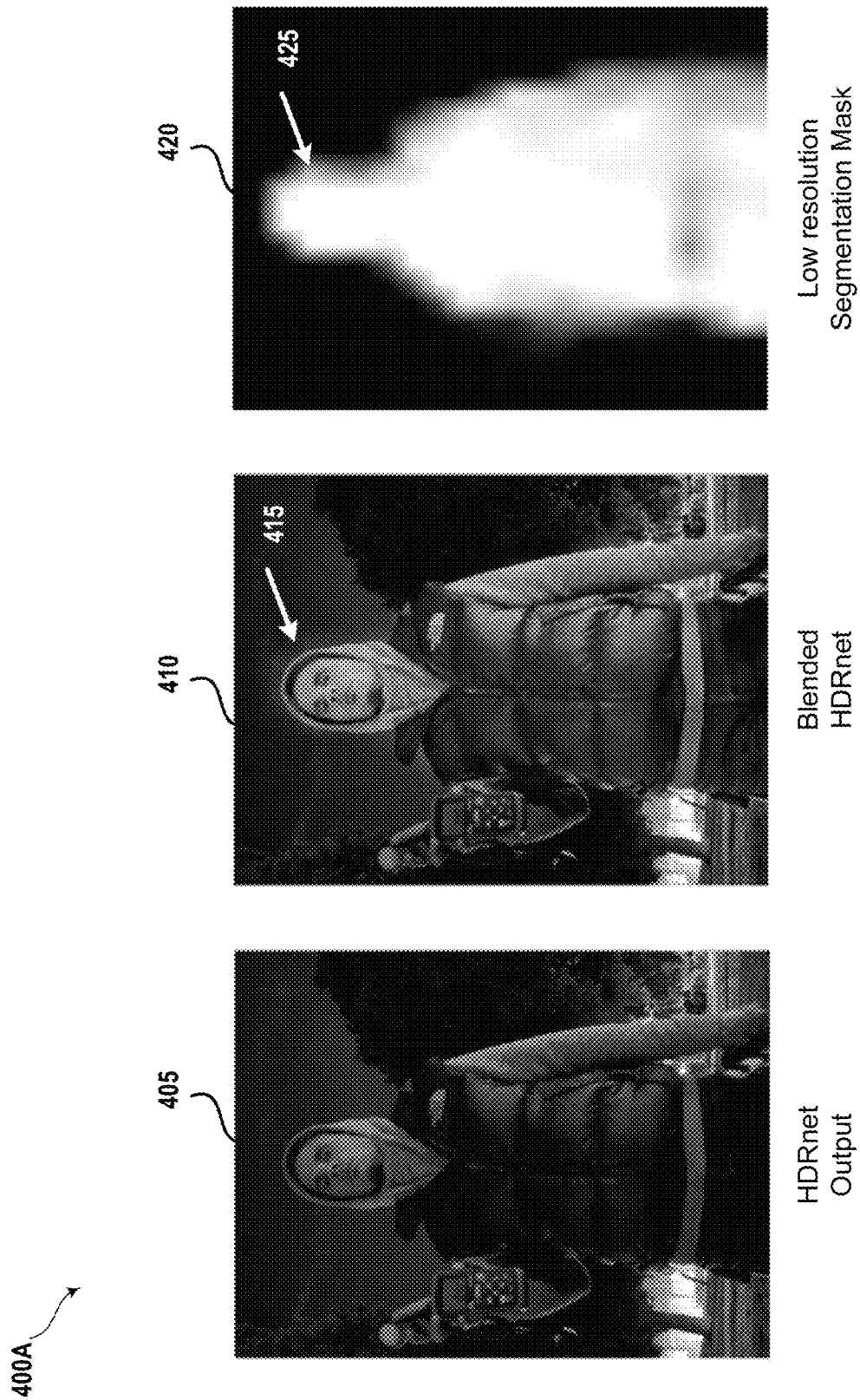

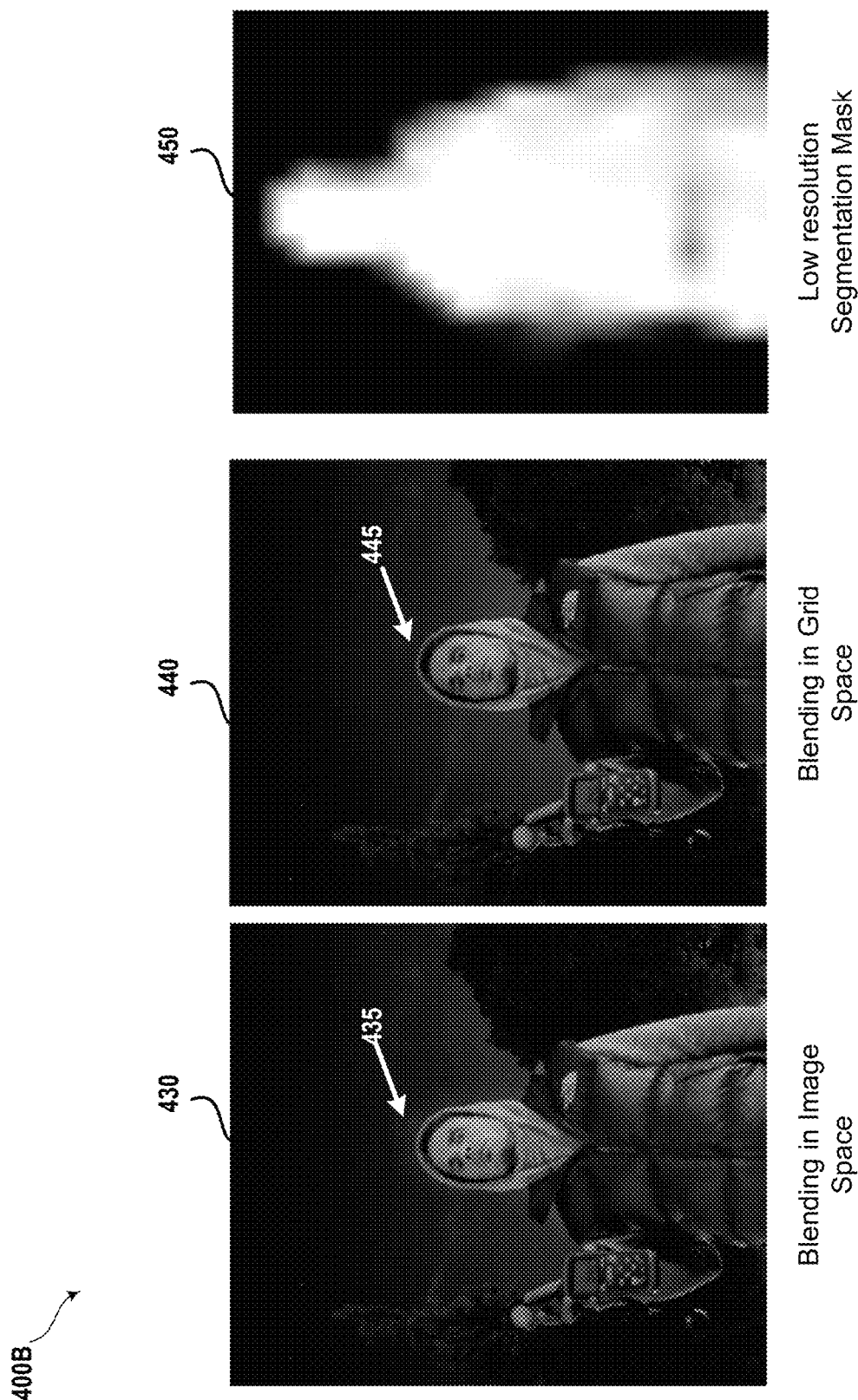

METHODS AND SYSTEMS FOR USER ADJUSTABLE REGION BASED BRIGHTNESS SETTINGS

BACKGROUND

Many modern computing devices, including mobile phones, personal computers, and tablets, include image capture devices, such as still and/or video cameras. The image capture devices can capture images, such as images that include people, animals, landscapes, and/or objects.

Some image capture devices and/or computing devices can correct or otherwise modify captured images. For example, some image capture devices can provide "red-eye" correction that removes artifacts such as red-appearing eyes of people and animals that may be present in images captured using bright lights, such as flash lighting. Also, for example, some image capture devices can provide image editing features such as relighting, brightness adjustments, correction of perspective distortion, adjustments to color characteristics, adjust shadow exposure levels, and so forth, to modify the image. In some instances, a preview of an image can be adjusted, and then the image may be captured. In other instances, an image may be adjusted after the image has been captured. A captured image can be saved, displayed, transmitted, printed to paper, posted on a social media platform, and/or otherwise utilized.

Mobile phone users generally have access to features that enable a brightness adjustment for an entire image.

SUMMARY

In one aspect, a computing device may be configured to provide features that enable one or more local brightness adjustment to be applied to one or more local regions of an image and, in some instances, a global brightness adjustment to be applied to the remainder of the image. For example, when the image is a portrait, a local brightness adjustment can be applied to a face region of the portrait, and a global brightness adjustment can be applied to a remainder portion of the portrait. Also, for example, local and global brightness adjustments can be combined with adjustments to a light direction, a shadow exposure level, and/or other automatic exposure level settings of a camera device. As another example, a first local region may be adjusted independently of a second local region.

In some implementations, mobile devices may be configured with these features so that an image can be enhanced in real-time. Also, for example, the described methods can be applied to in-the-wild images, including images in video content. In other aspects, mobile phone users can non-destructively enhance an image based on their preferences. Also, for example, pre-existing images in a user's image library can be enhanced based on techniques described herein.

In a first aspect, a computer-implemented method is provided. The method includes displaying, by a graphical user interface of a computing device, an image comprising a target region. The target region may be smaller than an entirety of the image. The method includes providing, by the graphical user interface, a user-adjustable control to adjust a desired local brightness exposure level for the target region. The method includes receiving, by the user-adjustable control, a user indication of the desired local brightness exposure level for the target region. The method includes adjusting the local brightness exposure level for the target region in the image in response to the user indication.

In a second aspect, a system is provided. The system may include one or more processors. The system may also include data storage, where the data storage has stored thereon computer-executable instructions that, when executed by the one or more processors, cause the system to carry out operations. The operations may include displaying, by a graphical user interface of a computing device, an image comprising a target region. The target region may be smaller than an entirety of the image. The operations may further include providing, by the graphical user interface, a user-adjustable control to adjust a desired local brightness exposure level for the target region. The operations may also include receiving, by the user-adjustable control, a user indication of the desired local brightness exposure level for the target region. The operations may additionally include adjusting the local brightness exposure level for the target region in the image in response to the user indication.

In a third aspect, a device is provided. The device includes one or more processors operable to perform operations. The operations may include displaying, by a graphical user interface of a computing device, an image comprising a target region. The target region may be smaller than an entirety of the image. The operations may further include providing, by the graphical user interface, a user-adjustable control to adjust a desired local brightness exposure level for the target region. The operations may also include receiving, by the user-adjustable control, a user indication of the desired local brightness exposure level for the target region. The operations may additionally include adjusting the local brightness exposure level for the target region in the image in response to the user indication.

In a fourth aspect, an article of manufacture is provided. The article of manufacture may include a non-transitory computer-readable medium having stored thereon program instructions that, upon execution by one or more processors of a computing device, cause the computing device to carry out operations. The operations may include displaying, by a graphical user interface of a computing device, an image comprising a target region. The target region may be smaller than an entirety of the image. The operations may further include providing, by the graphical user interface, a user-adjustable control to adjust a desired local brightness exposure level for the target region. The operations may also include receiving, by the user-adjustable control, a user indication of the desired local brightness exposure level for the target region. The operations may additionally include adjusting the local brightness exposure level for the target region in the image in response to the user indication.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 4A illustrates an example blending of an HDRnet image with a low resolution segmentation mask, in accordance with example embodiments.

FIG. 4B illustrates another example blending of an HDR-net image with a low resolution segmentation mask, in accordance with example embodiments.

DETAILED DESCRIPTION

Figure 1:
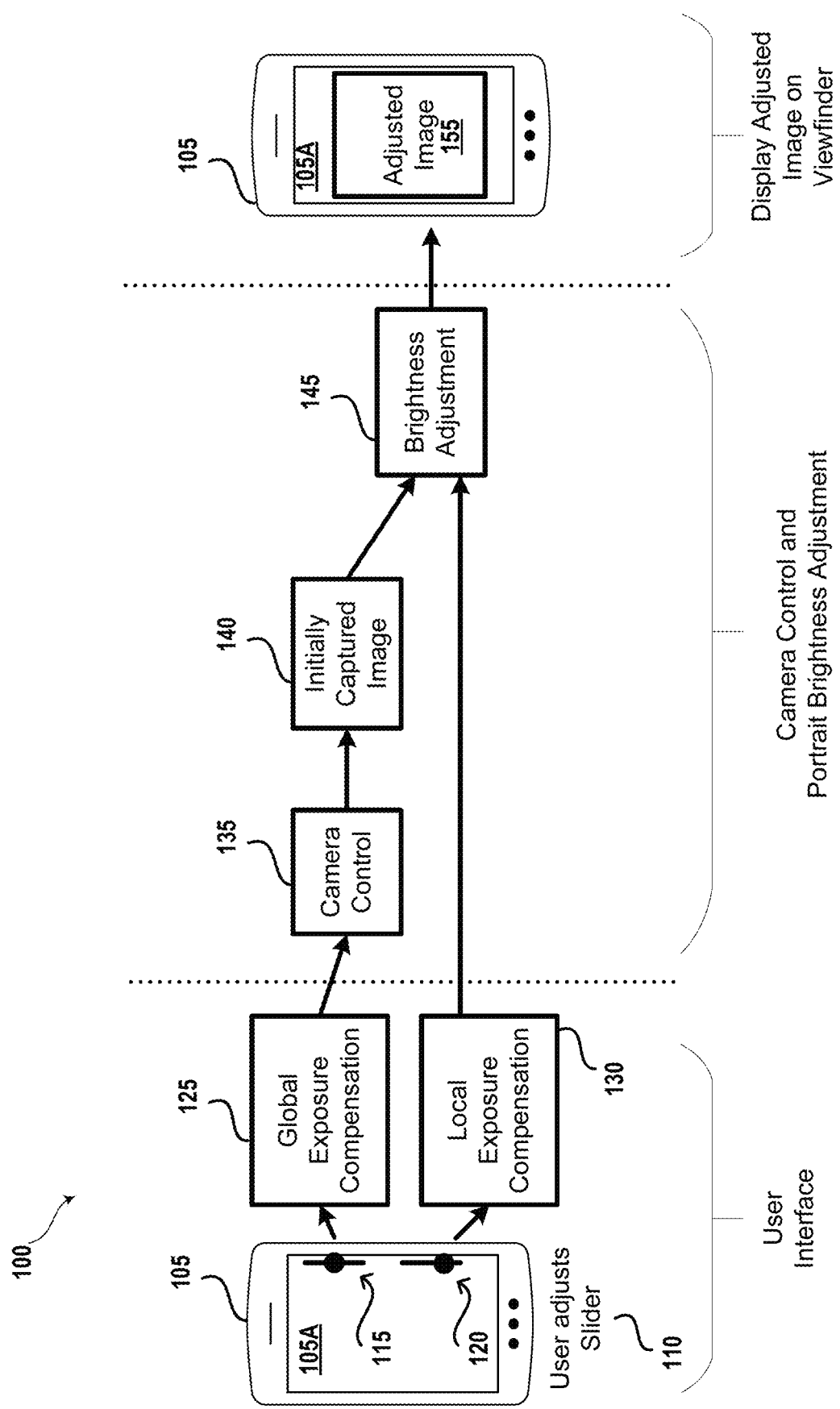
FIG. 1 illustrates an example system design for adjusting portrait brightness, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Overview

A camera includes an exposure control module that can adjust a level of brightness at the time an image is captured. There are at least two ways exposure control can be performed in mobile camera systems. One is an automatic exposure control that involves configuring a camera system with an algorithm to automatically determine the exposure level based on the lighting environment of a scene that is being captured. Such an option does not provide a user with control over the brightness of the captured image.

To provide users with greater control of the brightness, another option involves configuring the camera system to enable the user to set an exposure compensation to a desired level. In some instances, such an exposure level may be adjusted by users by using a slider tool displayed on a viewfinder in a touch screen. For example, the user may increase the brightness level by moving the slider in one direction, and reduce the brightness level by moving the slider in an opposite direction. This exposure composition may be provided to a camera control module that may be configured to increase or decrease the brightness of the pixels by either changing the exposure time, the aperture, an analog gain, and/or a post-capture digital gain.

Although global adjustments may be made to an image, in some situations, a user may desire to adjust a local brightness setting of a portion of the image. For example, when the image includes multiple individuals, the user may want to change the brightness settings for one or more of the individuals in the image. Also, for example, an auto exposure algorithm is generally available in existing camera systems. Such auto exposure algorithms can be configured to automatically determine exposure levels of next captured frames based on statistics of previously captured frames. Exposure compensation is a widely used exposure control technique in camera systems, and this allows users to manually control an exposure level of a photograph. For example, the user may specify a log-scale compensation value, and the camera system may be configured to boost the exposure level on top of what the auto exposure algorithm recommends if log-scale compensation value is positive, and reduce the exposure level if the log-scale compensation value is negative. However, such an exposure control is global, and users do not have an ability to change the exposure of a particular local region.

Some viewfinders may be configured to display a dual slider for dual exposure compensation, where the two sliders allow a user to specify two exposure compensation values. For example, a first slider may allow the user to adjust the brightness, and a second slider may allow the user to adjust the shadow. Unlike single-exposure compensation settings, for dual exposure compensation, boosting and/or reduction of the exposure values depends on a brightness level of the pixels before the compensation is applied. For example, a change of an exposure level (either boosting and/or reduction) of pixels in the brightness region is determined by the brightness exposure compensation value, and a change of an exposure level of pixels in the shadow region is determined by the shadow exposure compensation value. However, a separation of regions in dual exposure compensation is determined by the brightness of pixels, and not by a location of the pixels in the image.

Another technique used in image processing is applying an HDRnet. The HDRnet is a tone mapping algorithm that takes an image as input and outputs a low-resolution bilateral grid. Such a bilateral grid stores information about how to adjust the brightness level at each pixel. An application of the bilateral grid to the input image results in an adjustment of the brightness levels of the pixels. In turn, an output image may be generated that may be perceived to be a high-dynamic-range (HDR) image. In some instances, a user may have an ability to adjust the brightness level of the image by applying a global gain to the bilateral grid. However, this is a global adjustment of the brightness level, and does not provide an ability to adjust a local brightness level for a local region (e.g., a portrait).

Portrait relighting is another machine learning technique that allows users to change both the brightness of a portrait, as well as the lighting effect as a post capture step. However, this effect can only be applied after an image has been captured, and the user is unable to view an adjustment to a brightness level in a live viewfinder before capturing the image.

Accordingly, there is a need for a new user interface and a new exposure compensation technique to allow users to select the brightness level of a portrait region and a non-portrait region separately. Also, there is a need to have an ability to apply a desired brightness level to the portrait region, and view an adjustment to the brightness level in the live viewfinder before capturing the image. As described herein, a camera system may be configured to enable a user to adjust a local brightness for a smaller region of the image (e.g., the portrait region, the face region, and so forth), without changing the brightness level for the remainder of the image (e.g., the non-portrait region). Accordingly, a user may be able to capture an image with different renditions for portrait and non-portrait regions.

For example, a camera system can be configured to include a user interface that collects a user's intent on how much brightness boosting or reduction to apply, a camera control system that controls camera to capture an image based on the exposure compensation value suggested by the user, and a portrait brightness adjustment module that takes portrait brightness compensation specified by the user and the segmentation mask as input, and apply this brightness change only to the portrait region in a way that won't generate any halo artifacts.

Example Region-Based Brightness Adjustments

FIG. 1 illustrates an example system design for adjusting portrait brightness, in accordance with example embodiments. In some embodiments, the operations may involve displaying, by a graphical user interface of a computing device, an image comprising a target region, wherein the target region is smaller than an entirety of the image. For example, device 105 may include graphical user interface 105A. In some embodiments, device 105 may be a mobile device.

In some embodiments, graphical user interface 105A may display user-adjustable controls, such as, for example, first slider 115 to adjust a global brightness level, and second slider 120 to adjust a portrait brightness level. In some embodiments, the displaying of the image may involve displaying the image captured by a camera (e.g., of a mobile device). For example, graphical user interface 105A may be an interface that displays a captured image. In some embodiments, graphical user interface 105A may be a live-view interface that displays a live-view preview of an image.

In some embodiments, the displaying of the image may involve providing a live-view preview of the image prior to a capture of the image. In some embodiments, a live-view camera interface may include a single slider feature that allows for separate real-time adjustments to both local and global brightness levels in the live-view preview image stream (such that the preview image has the same local and global brightness levels as an image that is subsequently captured via a shutter button on the live-view interface). In other embodiments, a live-view camera interface may include two slider features that allow for separate real-time adjustments to both global and local brightness levels in the live-view preview image stream. Other types of interface features may also provide for separate real-time adjustments to global and local brightness levels, without departing from the scope of the invention.

Herein a "live-view preview" of an image should be understood to be an image or sequence of images (e.g., video) that is generated and displayed based on an image data stream from an image sensor of an image-capture device. For instance, image data may be generated by a camera's image sensor (or a portion, subset, or sampling of the pixels on the image sensor). This image data is representative of the field-of-view (FOV) of the camera, and thus indicative of the image that will be captured if the user taps the camera's shutter button or initiates image capture in some other manner. To help a user to decide how to position a camera for image capture, a camera device or other computing device may generate and display a live-view preview image based on the image data stream from the image sensor. The live-view preview image can be a real-time image feed (e.g., video), such that the user is informed of the camera's FOV in real-time. In some embodiments, the image may be a frame of a plurality of frames of a video.

In some embodiments, the user may open a camera system of device 105 (e.g., with a touch screen or other mechanism), and may direct the camera toward a scene, with an intent to capture an image. Graphical user interface 105A may display a live-view preview of the image. The user may select a target region of the displayed image to initiate a local adjustment of a brightness exposure level for the target region. In some embodiments, the target region may be automatically selected by device 105. For example, a device 105 may utilize one or more algorithms (e.g., an object detection algorithm, a face detection algorithm, a segmentation algorithm, and so forth) to identify one or more regions in the image as likely candidates for a local brightness adjustment. In some implementations, a user-approved facial recognition algorithm may be applied to identify one or more individuals in the image as likely candidates for a local brightness adjustment. For example, device 105 may have a history of user preferences, and may identify certain objects and/or individuals as being of high interest to the user. In some embodiments, the history of user preferences may be based on a history of past brightness level adjustments applied by the user. The target region may generally be smaller than an entirety of the image. For example, the image may be of a scene that includes an individual, and the target region may be the image of the individual. As another example, the image may be a portrait, and the target region may be a face portion.

The operations may further involve providing, by the graphical user interface, a user-adjustable control to adjust a desired local brightness exposure level for the target region. For example, the user may enter the screen of graphical user interface 105A that includes first slider 115, and second slider 120, by clicking on the portrait region on the viewfinder, and the two sliders will be displayed on the viewfinder. At 110, the user of device 105 may adjust first slider 115, second slider 120, or both. An adjustment of first slider 115 causes device 105 to determine a global exposure compensation 125 for an entirety of the image. An adjustment of second slider 120 causes device 105 to determine a local exposure compensation 130 for the target region.

The operations may also involve receiving, by the user-adjustable control, a user indication of the desired local brightness exposure level for the target region. For example, the user can either move first slider 115 (or the global brightness slider) to change the overall brightness of the displayed image. Also, for example, the user can move second slider 120 (or the local brightness slider, or the portrait slider) to change the brightness of the target region (e.g., the portrait region).

The operations may additionally involve adjusting the local brightness exposure level for the target region in the image in response to the user indication. In single exposure compensation design, camera control module 135 takes an exposure compensation value specified by the user as input, and captures frames that reach the specified brightness level. A similar approach may be applied herein for the global brightness compensation 125. A significant difference in the techniques described herein is that an additional region-based brightness adjustment module is introduced, that takes an initially captured frame as input, and adjusts the brightness of the target region only, based on the second portrait exposure control slider, second slider 120. In some embodiments, global exposure compensation 125 may be provided to camera control 135 which may, at 140, apply the desired global brightness level to the image. Local exposure compensation 130 may involve applying one or more algorithms that result in applying the desired local brightness level to the image. The global and local brightness levels are combined to determine brightness adjustment 145.

The operations may also involve displaying the adjusted image by the graphical user interface. For example, graphical user interface 105A of device 105 displays adjusted image 155. In operation, as the user adjusts first slider 115, second slider 120, or both, the viewfinder will simultaneously display the adjusted image 155 after brightness adjustment, in substantial real-time. In some embodiments, the user may trigger the shutter button to capture the displayed adjusted image 155, the same brightness adjustment is applied to the final captured photo.

In some embodiments, the graphical user interface may initially display an initial user-adjustable control to adjust a desired shadow exposure level. For example, graphical user interface 105A may initially display, instead of second slider 120, an initial slider to adjust a shadow exposure level or a highlight effect. In such embodiments, the providing of the user-adjustable control to adjust the desired local brightness exposure level may involve detecting, by the graphical user interface, that the target region comprises a face. For example, device 105 may detect that the displayed image includes a portrait, and device 105 may anticipate that the user may desire to adjust a brightness level for the portrait.

Some embodiments may involve providing, by the graphical user interface, the target region as a user-selectable portion of the image, wherein the user selectable portion is determined by applying machine learning based semantic segmentation. For example, the camera system may perform a machine learning based portrait segmentation algorithm that outputs a segmentation mask. Such embodiments may also involve receiving, by the graphical user interface, a user selection of the user-selectable portion of the image. The providing of the user-adjustable control may be in response to the user selection. For example, device 105 may detect that the user has selected a target region in the image.

Such embodiments may further involve automatically replacing, based on the detecting, the initial user-adjustable control to adjust the desired shadow exposure level to the user-adjustable control to adjust the desired local brightness exposure level for the face. For example, upon detecting that the displayed image includes a portrait, the initial slider for adjusting the shadow exposure level may be replaced with second slider 120 to enable the user to adjust a local brightness level for the portrait region. As another example, upon detecting that the user has selected a target region in the image, the initial slider for adjusting the shadow exposure level may be replaced with second slider 120 to enable the user to adjust a local brightness level for the selected target region.

Such embodiments may also involve providing, by the graphical user interface, a toggle button to receive a user indication of whether to perform the automatic replacing of the initial user-adjustable control. For example, a settings menu for device 105 may be configured to provide a toggle button that can be adjusted to an "on" or "off" position. The user may set the toggle button to the "on" setting to enable the automatic replacing of the initial user-adjustable control. Also, for example, the user may set the toggle button to the "off" setting to disable the automatic replacing of the initial user-adjustable control.

Herein, the "shadows" or "shadow areas" of an image (or sequence of images) should be understood to include pixels or areas in an image (or across a sequence of images) that are the darkest. In practice, a pixel or area(s) in the image frame having a brightness level below a predetermined threshold may be identified as a shadow area. Of course, other methods for detecting a darker area that qualifies as a shadow area are also possible.

Herein, the "highlights" or "highlights areas" of an image (or sequence of images) can include pixels or areas in an image (or across a sequence of images) that are the brightest. In practice, a pixel or area in the image frame having a brightness level above a predetermined threshold may be identified as a highlight area. Note that different thresholds may be utilized to classify shadow and highlight areas (such that areas can exist that are not classified as a shadow or highlight). Alternatively, the threshold for highlights and shadows may be the same (such that every area in the image is classified as a shadow or highlight). Further, the shadow and/or highlight threshold(s) might also be adaptive, and vary based on, e.g., the characteristics of the scene being captured. In some cases, the shadow and/or highlight threshold(s) could vary spatially across the image frame. Other methods for detecting a bright area that qualifies as a highlight area are also possible.

Figure 2:
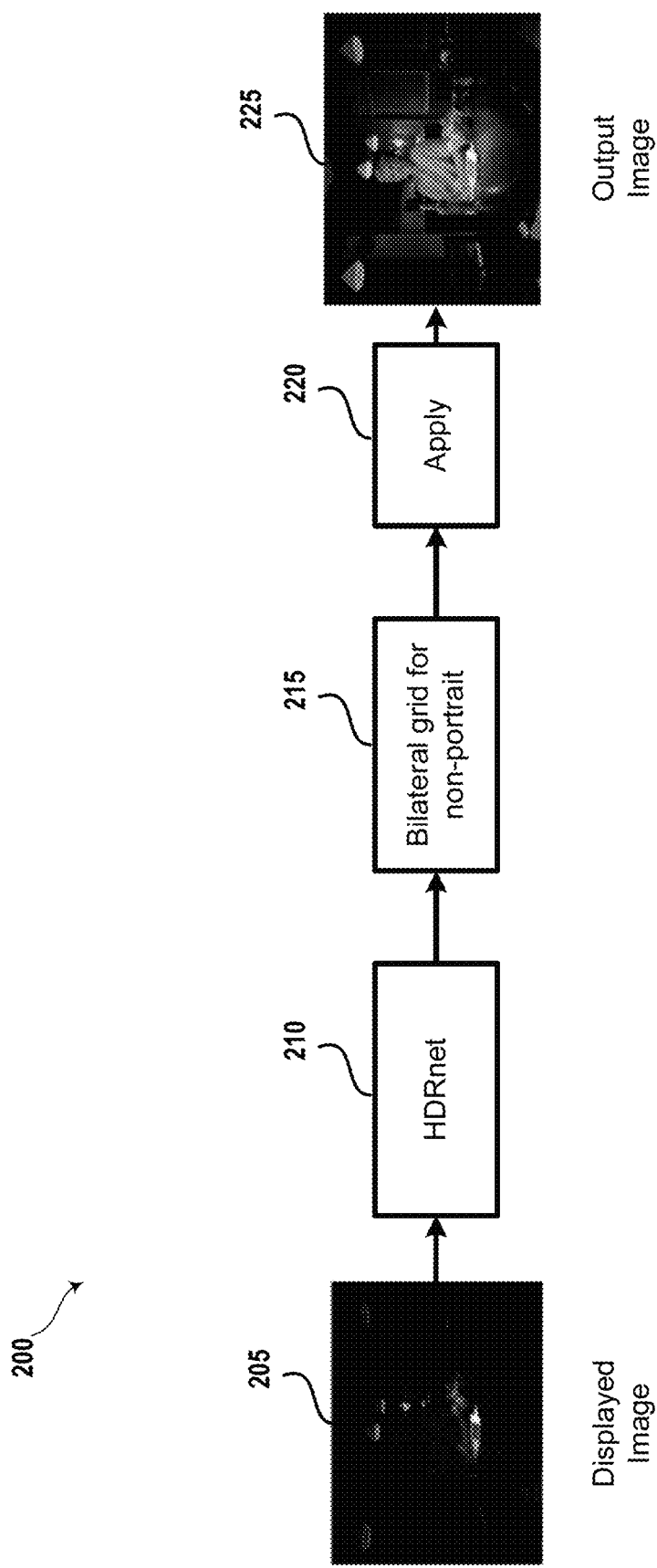
FIG. 2 illustrates an example bilateral grid algorithm, in accordance with example embodiments.

FIG. 2 illustrates an example bilateral grid algorithm 200, in accordance with example embodiments. Displayed image 205 includes a substantial amount of dark pixels. HDRnet 210 is applied to displayed image 205 to generate a bilateral grid 215 for the entirety of the image, for example, an entirety of the image outside the target region. As described herein, HDRnet 210 is an algorithm that takes displayed image 205 as input and outputs a low-resolution bilateral grid 215. For example, a modified version of a trained neural network (e.g., a convolutional neural network or "CNN"), such as Google's HDRnet tone mapping algorithm, may be utilized. In such embodiments, a CNN may provide a bilateral grid that serves as an image processing operator for local tonemapping. This local tonemapping grid may indicate different gain levels for different areas in the image frame. In such cases, user input provided by the user-adjustable control for adjusting brightness levels may be used to adjust the value of coefficients applied to gain at various points in the grid, and the adjusted tone-mapping grid may be applied to displayed image 205 to generate an adjusted image.

Bilateral grid 215 stores information about how to adjust the brightness level at each pixel in the image outside the target region. For example, if the image includes a portrait, bilateral grid 205 stores information about how to adjust the brightness level at each pixel in the non-portrait region. An application of bilateral grid 215 to displayed image 205 results in an adjustment of the brightness levels of the pixels. Output image 225 indicates how the brightness levels for the pixels have been adjusted to reveal aspects of displayed image 205 (e.g., an individual, lights hanging from the ceiling) that were previously hidden. Additional aspects of this process are described below.

Figure 3:
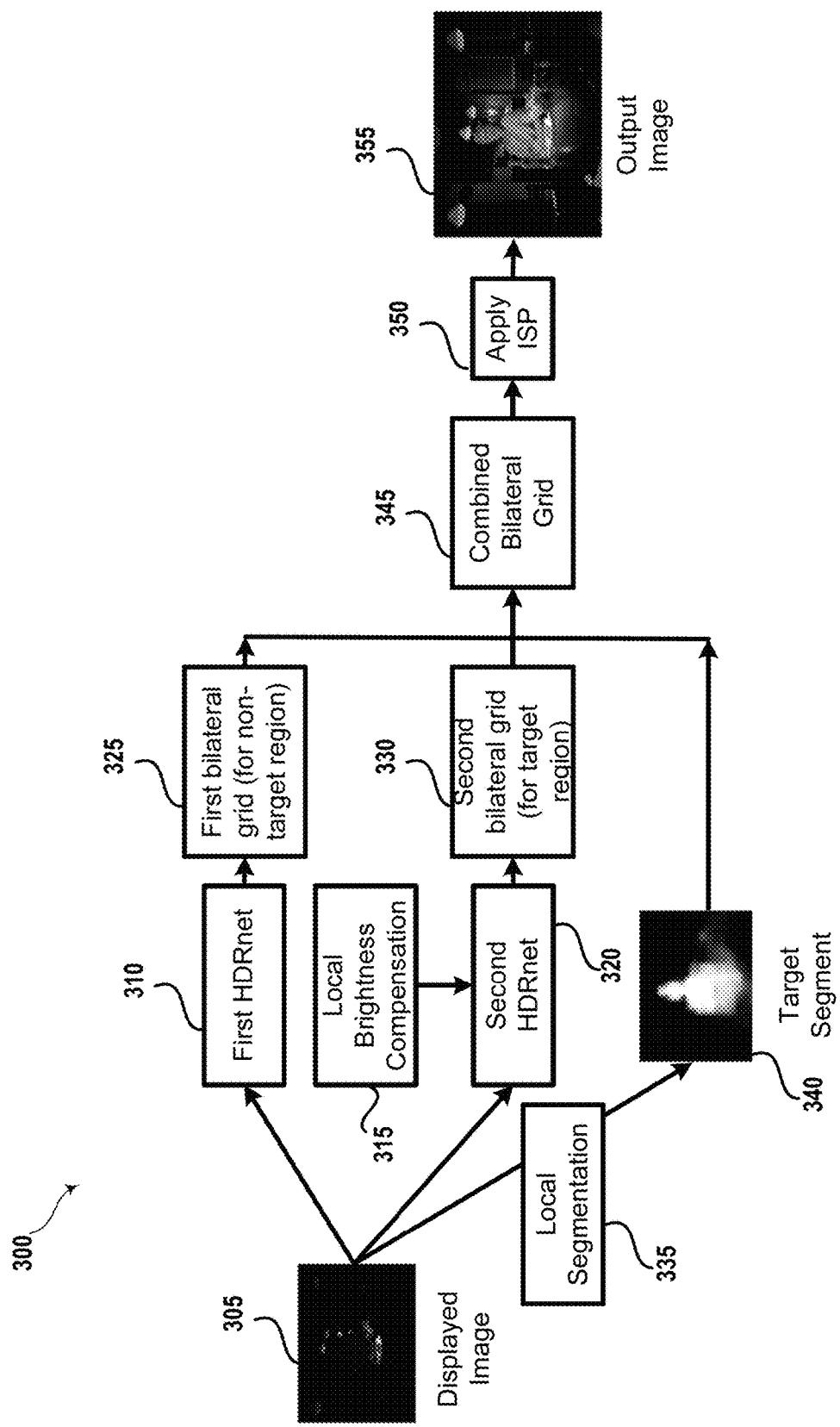
FIG. 3 illustrates an example tone mapping algorithm, in accordance with example embodiments.

FIG. 3 illustrates an example tonemapping algorithm, in accordance with example embodiments. Displayed image 305 includes a substantial amount of dark pixels. In some embodiments, the camera system may apply HDRnet twice and output two bilateral grids. First HDRnet 310 is applied to displayed image 305 to generate a first bilateral grid 325 for the non-target region that includes at least a portion of (e.g., an entirety of) the image outside the target region. In some embodiments, first HDRnet 310 and first bilateral grid 325 may share one or more aspects in common with HDRnet 210 and bilateral grid 215, respectively, of FIG. 2. In some embodiments, brightness compensation for the non-target region may be generated based on user input provided by the user-adjustable control (e.g., slider 115 of FIG. 1) for adjusting brightness levels for the region outside the target region, and a brightness compensation may be used to adjust the value of coefficients applied to gain at various points in first bilateral grid 325.

Second HDRnet 320 is applied to displayed image 305 to generate second bilateral grid 330 for the target region. In some embodiments, local brightness compensation 315 for the target region may be generated based on user input provided by the user-adjustable control (e.g., slider 120 of FIG. 1) for adjusting brightness levels for the target region. Local brightness compensation 315 may be used to adjust the value of coefficients applied to gain at various points in second bilateral grid 330. For example, second bilateral grid 330 indicates a brightness level for portrait rendition. The brightness level may be a global brightening (e.g., if portrait compensation is positive), or a global darkening (e.g., if portrait compensation is negative). The adjusted tone-mapping grid may be applied to displayed image 305.

To ensure that the brightness change is applied to the target region, the camera system utilizes an image segmentation algorithm that outputs a segmentation mask. Local segmentation 335 may be applied to displayed image 305 to generate target segment 340. The term "segmentation" generally refers to a pixel level marking of regions of interest in an image. Local segmentation 335 may involve applying a CNN, such as, for example, a U-net, or a Mask R-CNN. Also, for example, local segmentation 335 may involve one or more of edge detection segmentation, region-based segmentation, and so forth. Local segmentation 335 may also involve semantic segmentation, instance segmentation, and so forth. In some embodiments, when displayed image 305 includes an image of an individual, target segment 340 can be a segmentation mask for the image of the individual. Also, for example, when displayed image 305 includes an image of two or more individuals, target segment 340 can be a segmentation mask for the image of the two or more individuals. Generally, a low resolution is used for target segment 340. Such a low resolution segmentation uses less compute resources, and may be performed efficiently on a mobile device.

In some embodiments, the bilateral grid adjustment may be based on a combination of the first bilateral grid 325 and the second bilateral grid 330. The two bilateral grids are then combined together using the portrait segmentation mask, target segment 240. For example, first bilateral grid 325, second bilateral grid 330, and target segment 340, are combined to generate combined bilateral grid 345. An apply operation 350 applies combined bilateral grid 345 to generate output image 355. For example, combined bilateral grid 345 is applied to displayed image 305, causing the non-portrait region to achieve a first brightness target specified by the user adjustable control for global brightness (e.g., slider 115 of FIG. 1), and causing the portrait region to achieve a brightness target specified by the user adjustable control for local brightness (e.g., slider 120 of FIG. 1).

Semantic segmentation is a machine learning technique that takes an image as input and outputs a binary segmentation mask that classifies pixels based on predefined classes (e.g., whether the pixels belong to a target region). This technique may be used to change the brightness of the target region. In some embodiments, a portrait semantic segmentation algorithm may be used. However, in some embodiments, the applying of the brightening to the target region based on segmentation may result in an undesirable halo effect.

For example, HDRnet tonemapping may be applied twice, with at least one application involving a higher gain on shadow regions. The two image outputs of the HDRnet tonemapping application can be blended together using the segmentation mask. For example, the two image outputs can be alpha blended using the segmentation mask. However, the segmentation mask available in real-time is a low resolution mask (e.g., 32×32), and such a blending process may lead to an introduction of a halo artifact. Also, for example, the high-resolution image frame would need to be processed, which can be computationally resource intensive in real-time.

FIG. 4A illustrates an example blending of an HDRnet image with a low resolution segmentation mask, in accordance with example embodiments. For example, images 400A display a halo effect when the segmentation mask is applied. A default HDRnet output 405 is shown with darker regions over the individual. Blended HDRnet output 410 illustrates how a blending of the two image outputs of the HDRnet tonemapping application with a low resolution segmentation mask can produce halo 415 appears around the individual. Segmentation mask 420 is a low resolution segmentation mask. Generally, when segmentation mask 420 is applied, the boundary 425 of the mask may not perfectly align with a boundary of the target region, which in this example is an individual.

The misalignment of the boundary of the segmentation mask 420 and the target region can occur because segmentation mask 420 is a low resolution image comprising small rectangular shaped regions. The small rectangular shaped regions near the boundary 425 of the target region, such as the image of the individual, may overlap with the non-target region. Accordingly, when the pixels corresponding to segmentation mask 420 are brightened, the non-target regions near the boundary 425 of the target region are also brightened, resulting in halo artifact 415. Although a high resolution segmentation mask may be used to reduce and/or eliminate this halo artifact 415, such a high resolution segmentation mask would utilize higher compute resources, which are generally unavailable on a mobile platform.

Such embodiments may further involve generating a low resolution segmentation mask for the target image. For example, the combination of the first bilateral grid and the second bilateral grid may include the segmentation mask for the target image. Accordingly, two bilateral grids, one for the target region and one for the non-target region, is combined with segmentation mask 420 to generate a combined bilateral grid, and the halo artifact may be reduced and/or eliminated.

In some embodiments, the two image outputs of the HDRnet tonemapping application can be blended in a grid space, instead of an image space. As a result, the halo artifact can be mitigated, even with super low resolution frames.

FIG. 4B illustrates another example blending of an HDRnet image with a low resolution segmentation mask, in accordance with example embodiments. For example, images 400B illustrate a mitigation of a halo effect when the segmentation mask is applied. Image 430 illustrates an output image where two HDRnet image outputs are blended with a low resolution segmentation mask (e.g., segmentation mask 450), where the blending is performed in an image space. This results in a halo artifact 435. The term "image space" generally refers to a spatial coordinate system where points in the coordinate system correspond to positions of the pixels as arranged in a rectangular array (e.g., rows and columns) in the image.

Image 440 illustrates an output image where two HDRnet image outputs are blended with a low resolution segmentation mask (e.g., segmentation mask 450), where the blending is performed in a grid space. As a result, the halo artifact can be mitigated, as indicated generally by region 445. The term "grid space" generally refers to a coordinate system where points in the coordinate system correspond to values of light intensities of pixels in the image. In some embodiments, an intensity at each grid point can be stored as an 8-bit integer in black-and-white images. For color images, as there are three "primary" colors, red, green, blue (RGB), three sets of 8-bit integers are used, and each grid point can be stored as an 8×3=24-bit integer. In some embodiments, a resolution of an image can be increased by decreasing the grid spacing. This process is further described with reference to FIG. 5.

Figure 5:
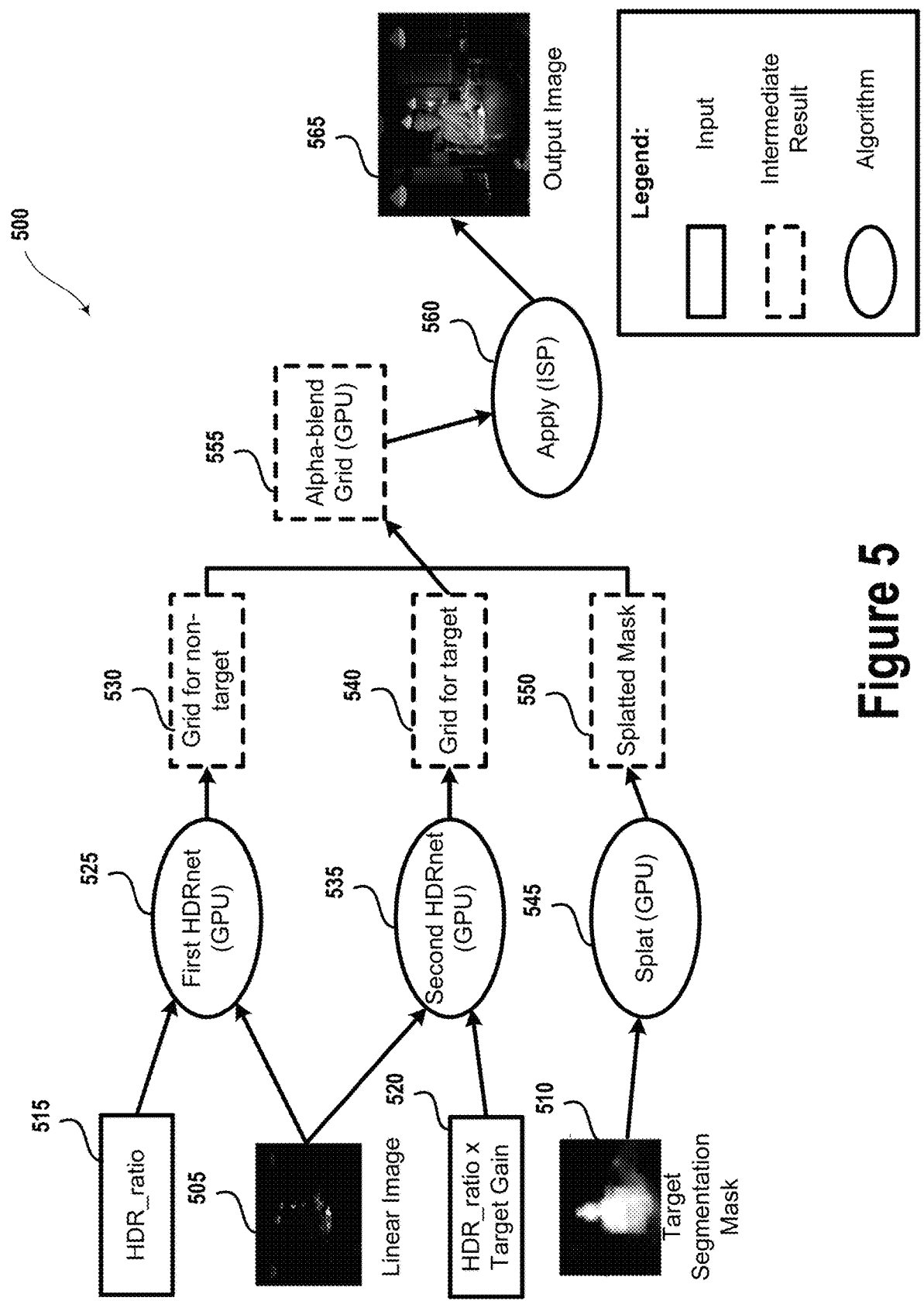
FIG. 5 illustrates an example block diagram for adjusting portrait brightness, in accordance with example embodiments.

FIG. 5 illustrates an example block diagram 500 for adjusting portrait brightness, in accordance with example embodiments. A low resolution linear image 505 may be received. For example, low resolution linear image 505 may be generated by image signal processor (ISP). A target segmentation mask 540 indicative of a segmentation for a target region can be generated. HDR_ratio 515 for a non-target region can be applied to linear image 505. HDR_ratio 515 can be a contrast ratio (e.g., 20,000:1, 1,080,000:1, and so forth) based on a type of display (e.g., LCD, LED, OLED, and so forth). Also, for example, target gain 520 for a target region can be applied to linear image 505. In some embodiments, target gain 520 can be a result of a product of a target gain and HDR_ratio 515.

Although target gain 520 can brighten a target region, the amount of brightness applied is based on HDR_ratio 515. For example, target gain 520 is based on an amount of additional brightness that is to be added to the target region. In some embodiments, an actual brightening algorithm (e.g., portrait brightening integrated in HDRnet local tonemapping (LTM) node) and a brightness control algorithm (e.g., portrait auto-exposure (AE)), may be separated. This facilitates flexibility in controlling the brightening in different scenarios, and ensures that the brightening is consistent with a viewfinder and snapshot features of the camera.

For instance, an AE process may determine a first exposure setting, which controls the exposure settings for image capture, absent further input from the user. In an example embodiment, the first exposure setting may indicate a total exposure time (TET) for the entire image frame (e.g., a global exposure, if no other adjustments are made by the user). This exposure time can be implemented by setting the amount of analog gain (e.g., sensitivity of the image sensor), and digital gain (e.g., gain applied to image data that has been generated by the image sensor). In implementations, the TET used to capture an image (e.g., a "capture TET") may also be used as the exposure level for the highlights areas in an image, and thus may also be referred to as the "highlight TET." (In practice, the shadow TET will usually be higher than the capture TET or highlight TET, so that details of the shadows are more visible.) A longer TET can be determined for shadow areas, which can be implemented by applying additional gain to the TET for highlights. As such, the highlight TET may also be characterized as the "short" TET, and the shadow TET may be characterized as the "long" TET.

In some embodiments, the brightness control algorithm (e.g., portrait AE) may be performed through "portrait_tet," in addition to "long_tet" that is used in default HDRnet. Generally, "long_tet" controls a brightness of a shadow region, and target gain 520 may be determined as a ratio of portrait_tet to long_tet. Target gain 520 represents the additional gain that is to be applied to the target region, as compared to the non-target region. In some embodiments, different renditions (e.g., different AEs) may be used for video capture and photo capture. Accordingly, two different AE algorithms may be applied.

First HDRnet 525 is applied to linear image 505 along with HDR_ratio 515 to generate a first intermediate result, a grid for the non-target 530. Likewise, second HDRnet 535 is applied to linear image 505 along with target gain 520 to generate a second intermediate result, a grid for the target 540. In some embodiments, inference weights for the first and second HDRnets are the same, and batched inference may be implemented to reduce latency and power.

In some embodiments, a splat algorithm 545 is applied to target segmentation mask 510 to generate a splatted segmentation mask 550. The term "splat" or "splatting" as used herein, generally refers to an object-order algorithm in image processing, or an application thereof, where rendering is performed in object space and operates on a per-object basis. In some embodiments, such an algorithm can be applied to a target region that can be treated as an object. Accordingly, the term "splatted segmentation mask" refers to a segmentation mask that has been generated by applying a splatting algorithm.

The grid for the non-target 530 and the grid for the target 540 are blended together using splatted segmentation mask 550. For example, the grid for the non-target 530 and the grid for the target 540 are alpha-blended together using splatted segmentation mask 550, to generate alpha-blend grid 555. Subsequently, alpha-blend grid 555 is applied in ISP 560, thereby mitigating halo artifacts in output image 565. For example, alpha-blend grid 555 is provided to the LTM block of ISP 560. The LTM block applies the brightening effect as part of processing from LTM to full resolution stream, prior to generating output image 585.

Generally, portrait brightening can be applied in the driver (e.g., viewfinder) as part of HDRnet. However, this is typically not usable for HDR+, because HDR+ uses a different LTM algorithm. In order to apply portrait brightening to the HDR+ LTM, an alternate approach can be adopted. To ensure that local brightening of the target region is applied in the driver (e.g., viewfinder) and in HDR+(e.g., snapshot), a portrait brightening operator can be integrated into HDR+. For example, a default portrait relighting algorithm may apply directional lighting, but does not change the brightness of the portrait.

Figure 6:
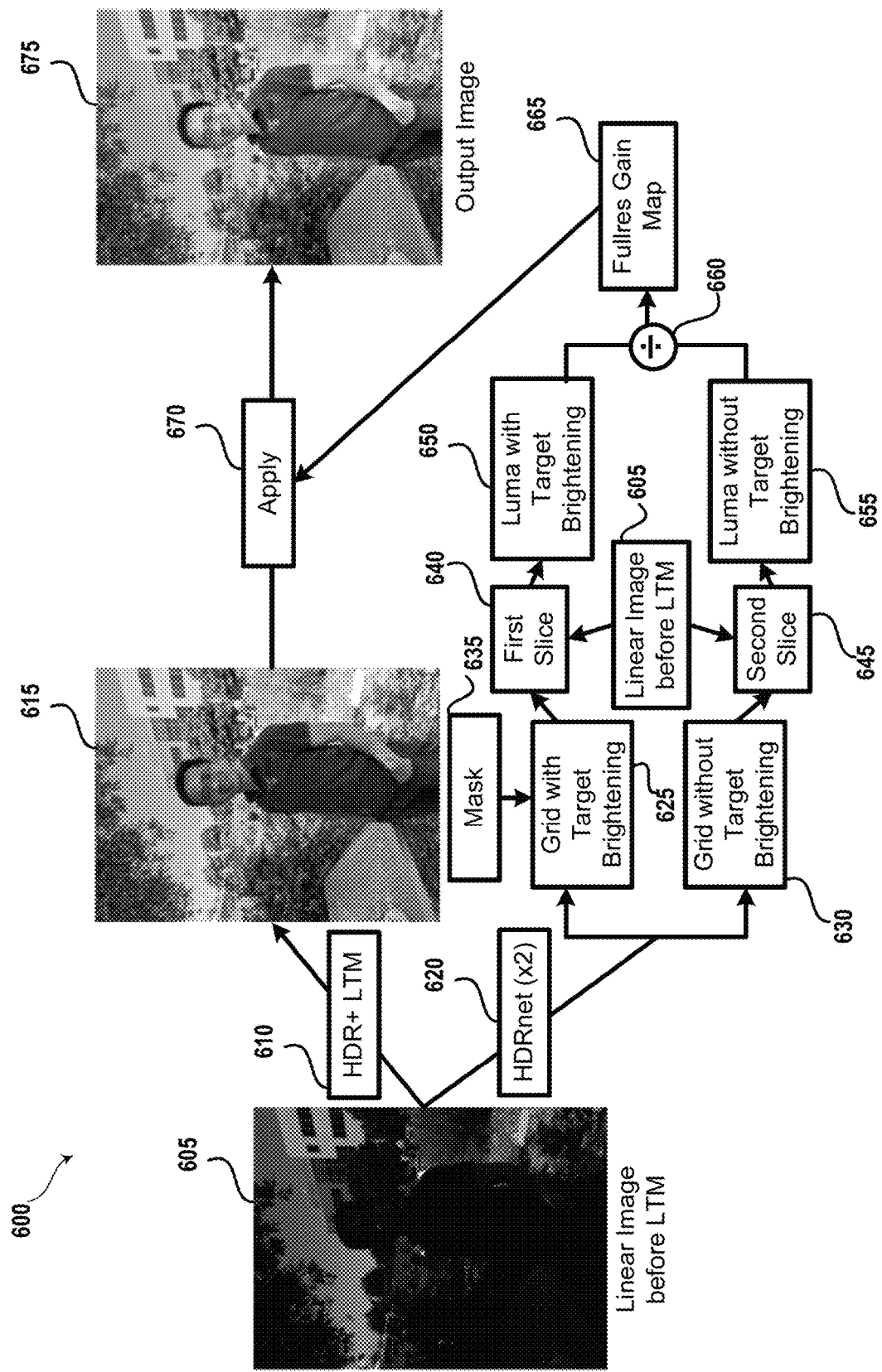
FIG. 6 illustrates an example block diagram for adjusting portrait brightness in high dynamic range (HDR), in accordance with example embodiments.

FIG. 6 illustrates an example block diagram 600 for adjusting portrait brightness in high dynamic range (HDR), in accordance with example embodiments. Linear image 605 is received. Linear image 605 is an image prior to an application of LTM. HDR+ LTM 610 is applied to linear image 605 to generate tonemapped image 615. As described previously, two HDRnets may be applied twice, indicated as HDRnet (×2) 620. For example, HDRnet (×2) 620 can be similar to first HDRnet 525 and second HDRnet 535 of FIG. 5. Grid with target brightening 625 and grid without target brightening 630 may be generated based on HDRnet (×2) 620. In some aspects, grid with target brightening 625 and grid without target brightening 630 may share one or more features in common with grid for target 540 and grid for non-target 530, respectively, of FIG. 5. Also, for example, mask 635 may be generated. For example, mask 635 may share one or more features in common with splatted mask 550 of FIG. 5.

First slice 640 and second slice 645 may be generated based on grid with target brightening 625 and grid without target brightening 630, and linear image 605. Generally, computations for grid with target brightening 625 and grid without target brightening 630 are performed at a low resolution. For example, a downsampled version of the full-resolution linear image 605 may be processed through a plurality of convolutional layers to estimate the respective bilateral grid, grid with target brightening 625 and grid without target brightening 630, of affine coefficients. In some implementations, the low-resolution operations may be split into two paths to learn global and local features, which may then be fused together prior to a prediction. The slicing operation to generate first slice 640 and second slice 645 is performed after the bilateral grids (e.g., grid with target brightening 625 and grid without target brightening 630) are generated. In some embodiments, the slicing operation involves a high-resolution computation by learning a grayscale guidance map to upsample each grid of affine coefficients (e.g., grid with target brightening 625 and grid without target brightening 630), back to a full-resolution image. For example, the slicing operation takes as input the grayscale guidance map and a first feature map, viewed as a bilateral grid, that has a much lower resolution than the grayscale guidance map. The result of the slicing operation is a new feature map that has the same spatial resolution as the grayscale guidance map.

Luma with target brightening 650 is generated based on first slice 640. In like manner, luma without target brightening 655 is generated based on second slice 645. The term "luma" generally refers to an achromatic portion of an image that is indicative of an amount of brightness in the image. Generally, luma and chromatic information may be combined to obtain data related to an image. Accordingly, luma with target brightening 650 is a first gain map indicative of an amount of brightness to be applied in the target region of linear image 605, and luma without target brightening 655 is a second gain map indicative of an amount of brightness to be applied in the non-target region of linear image 605.

A delta difference 660 between luma with target brightening 650 and luma without target brightening 655 is determined. Delta difference 660 identifies a full resolution (fullres) gain map 665 that needs to be applied to the target region of linear image 605, to obtain a resulting image with a desired amount of brightness applied to the target region. As previously described, image 615 is obtained by applying HDR+ LTM to linear image 605. As illustrated, image 615 is generally brighter than linear image 605. Accordingly, at apply 670, fullres gain map 665 is applied to image 615 to apply a differential brightness to the target region. This results in output image 675 where the brightness level of image 615 is maintained with an additional brightness applied to the target region, in this case the image of an individual.

Example User Interface

Figure 7A:
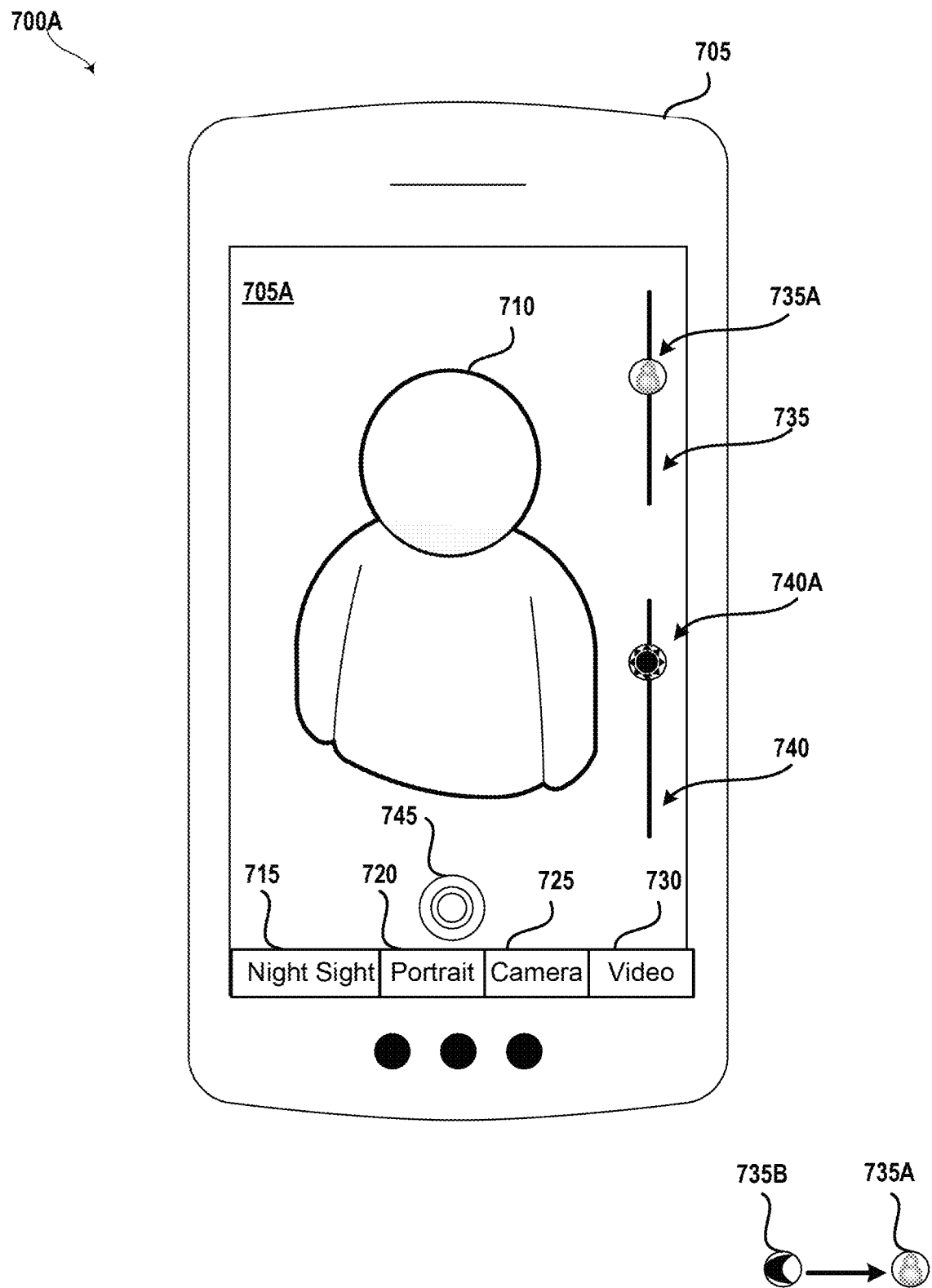
FIG. 7A illustrates an example user interface for adjusting a local brightness exposure level, in accordance with example embodiments.

FIG. 7A illustrates an example user interface 700A for adjusting a local brightness exposure level, in accordance with example embodiments. Device 705 can include a display component 705A. Display component 705A may be configured to display an image 710. In some embodiments, image 710 may be a photographic image that may have been captured by a camera component of device 705, and/or stored in a memory of device 705. In some embodiments, image 710 may be an image that is stored at an online content delivery system that is accessed by device 705. For example, image 710 may be an online service that allows users to store and/or share images, and a user may access the online service to view image 710.

In some embodiments, display component 705A may be a live-view interface that can provide for real-time pre-image-capture control and visualization capabilities via a camera system of device 705. For example, a user may use a camera of device 705 to point to a scene, and display component 705A may display a real-time preview of the scene. In some embodiments, display component 705A can be configured to display one or more modes, such as, night sight 715, portrait 720, camera 725, and video 730. For example, selection of mode night sight 715 enables a user to preview and/or capture an image in low-light conditions. Portrait 720 is a mode that enables a user to utilize features such as brightness control, shadow exposure levels, light direction and so forth, especially when taking an image of a human subject. Camera 725 can enable a user to capture image 710. For example, a user can tap button 745 and hold it to view/edit image capture settings, and tap button 754 again to capture image 745. Also, for example, video 730 enables a user to record a video of the scene. For example, users can tap button 745 to begin capturing a video, and then tap button 745 to stop capturing the video.

Some embodiments may involve providing, by the graphical user interface, the target region as a user-selectable portion of the image, wherein the user selectable portion is determined by applying machine learning based semantic segmentation. For example, a segmentation mask can be determined for object 710 and object 710 can be displayed as a selectable object. This may be an indication to the user of device 705 that adjustments to the local brightness exposure levels are available for object 710. In some embodiments, the segmentation mask can be determined by applying machine learning based semantic segmentation techniques. In some embodiments, more than one user-selectable portion can be identified.

The choice for user-selectable portions may be based on a variety of factors. For example, a history of user preferences may indicate that a user prefers to adjust the local brightness exposure levels for certain objects in images (e.g., certain friends and family members, pets, cars, and so forth). As another example, the history of user preferences may indicate the user prefers to always darken a sky portion in an image, brighten a water portion of an image, highlight flowers, accentuate certain colors, such as yellow. Additional, and/or alternative user-selectable portions may be determined. In some embodiments, a machine learning model may be utilized to detect and analyze patterns from the history of user preferences, and the user-selectable portions may be determined based on the identified patterns. Also, for example, facial recognition algorithms can be applied to detect faces, and the user-selectable portions may be determined based on the detected faces. In some embodiments, a user selection of the user-selectable portion of the image can be received, and the user-adjustable control may be provided in response to the user selection.

In some embodiments, display component 705A can provide control and visualization of local and global brightness exposure levels, independently from one another. In some embodiments, such control can be provided for a captured image. Also, for example, display component 705A can be a live-view interface, and such controls can be provided in a live-view preview image. The operations may further involve providing, by the graphical user interface, a user-adjustable control to adjust a desired local brightness exposure level for the target region. For example, a live-view interface can include first slider 735 with first user-adjustable control 735A to adjust a desired local brightness exposure level for the target region.

Some embodiments may involve providing, by the graphical user interface, a second user-adjustable control to adjust a desired global brightness exposure level for the image. For example, a live-view interface can include second slider 740 with second user-adjustable control 740B to adjust a desired global brightness exposure level for an entirety of the image outside the target region ("non-target" region).

The operations may also involve receiving, by the user-adjustable control, a user indication of the desired local brightness exposure level for the target region. For example, a user of device 705 may slide first user-adjustable control 735A along first slider 735. In some embodiments, an upward movement of first user-adjustable control 735A along first slider 735 may be a user indication to increase local brightness exposure level for the target region. Likewise, downward movement of first user-adjustable control 735A along first slider 735 may be a user indication to decrease local brightness exposure level for the target region.

In many scenarios, first user-adjustable control 735A and the second user-adjustable control 740A are independently moveable on slider 735 and 740, respectively. Moving first user-adjustable control 735A on slider 735 will show the resulting adjustments to the camera's exposure settings in real-time for the target region, for example, in the live-view preview image. Also, for example, moving second user-adjustable control 740A on slider 740 will show the resulting adjustments to the camera's exposure settings in real-time for an entirety of the image. Further, the live-view preview image is indicative of the image or video that will be captured if the user taps the image-capture button 745 at that time. In some embodiments, the adjustments to the global brightness exposure level may apply to a non-target region, instead of the entirety of the image.

In some embodiments, a gain for the local brightness exposure level for the target region may depend on the gain for the global brightness exposure level for the entirety of the image. For example, a user may move first user-adjustable control 735A to indicate a 2X amount of gain in local brightness exposure level for the target region. The user may then move second user-adjustable control 740A to indicate a 3X amount of gain in global brightness exposure level. Accordingly, the gain in local brightness exposure level for the target region can be adjusted to 6X, to account for the 3X gain in the global brightness exposure level.

In some embodiments, first slider 735 may have an initial user-adjustable control 735B to adjust a desired shadow exposure level. Device 705 can be configured to detect that the target region comprises a human portrait. Based on the detecting, device 705 can be configured to automatically replace initial user-adjustable control 735B to adjust the desired shadow exposure level with first user-adjustable control 735A to adjust the desired local brightness exposure level for the human portrait. Depending on the image, the replaceable setting may be applied to other detectable objects in the image. For example, one or more objects in the image may be detected as likely candidates for a local brightness exposure level adjustment, and upon such detection, device 705 can be configured to automatically replace initial user-adjustable control 735B to adjust the desired shadow exposure level with first user-adjustable control 735A to adjust the desired local brightness exposure level for the detected object. Also, for example, the initial user-adjustable control may not be limited to a user-adjustable control to adjust a shadow exposure level.

Such embodiments may also involve providing, by the graphical user interface, a toggle button to receive a user indication of whether to perform the automatic replacing of the initial user-adjustable control. For example, a settings feature of device 705 can include the toggle button for the user to indicate whether to perform the automatic replacing of initial user-adjustable control 735B to adjust the desired shadow exposure level, with first user-adjustable control 735A to adjust the desired local brightness exposure level for the human portrait.

Figure 7B:
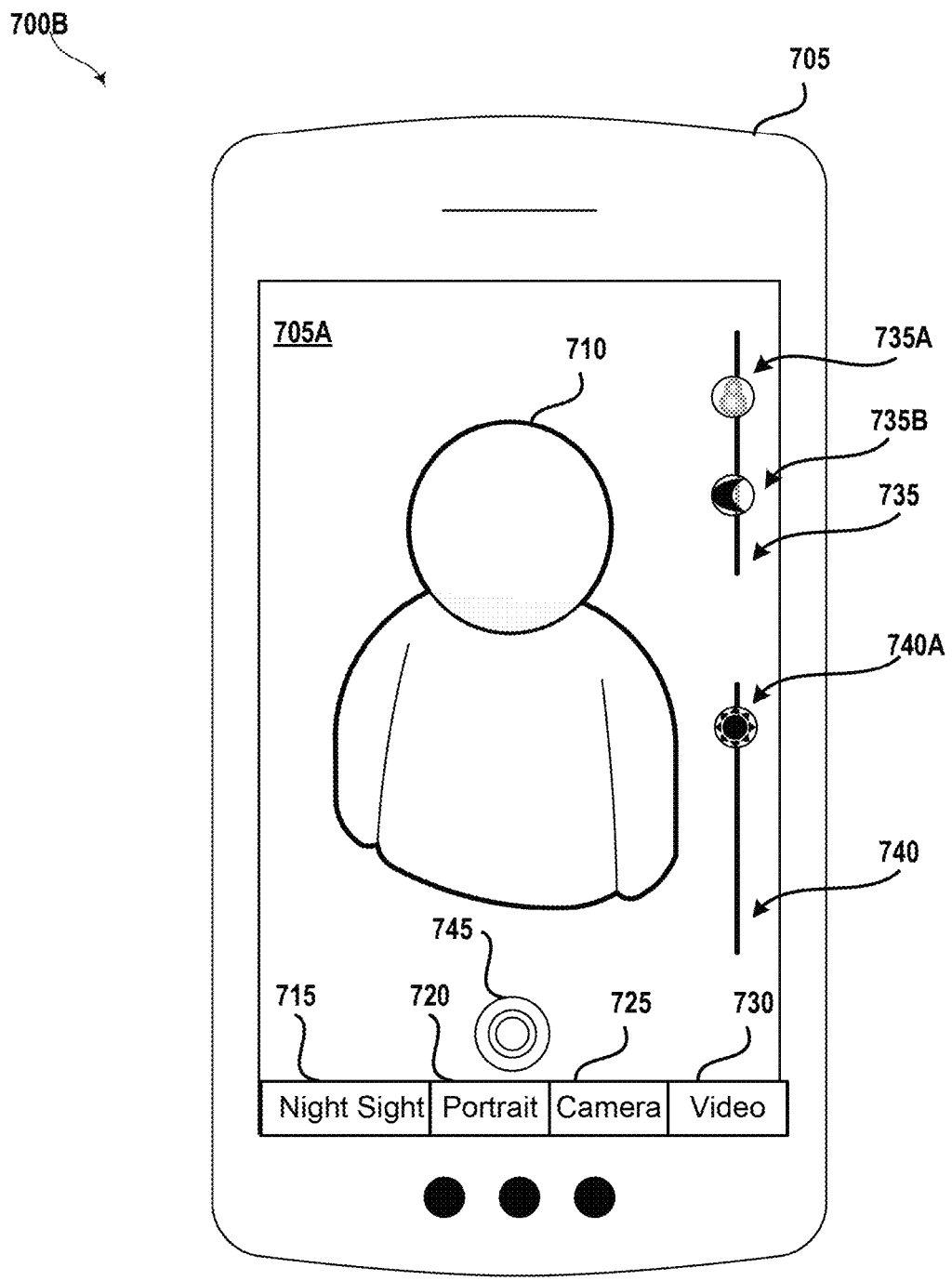
FIG. 7B illustrates another example user interface for adjusting a local brightness exposure level, in accordance with example embodiments.

FIG. 7B illustrates another example user interface 700B for adjusting a local brightness exposure level, in accordance with example embodiments. For example, display component 705A can include first slider 735 with first user-adjustable control 735A to adjust a desired local brightness exposure level for target region 710. Also, for example, first slider 735 can include third user-adjustable control 735B to adjust the desired shadow exposure level. In some embodiments, respective movements of first user-adjustable control 735A and third user-adjustable control 735B on slider 735 can be configured so as not to allow them to overlap or cross over one another. For example, slider 735 can be configured with distinct portions for the respective movements of first user-adjustable control 735A and third user-adjustable control 735B on slider 735.

For example, to maintain a certain image quality, the movement of first user-adjustable control 735A and third user-adjustable control 735B on slider 735 may be partially dependent on one another. In particular, there may be a certain amount of range compression in an image that is deemed acceptable, possible, and/or practical. As such, first user-adjustable control 735A and third user-adjustable control 735B may be moved independently from one another on slider 735, so long as they do not change the local brightness exposure and/or the shadow exposure in a manner that causes the range compression in the live-view preview image to exceed a threshold. Similar considerations may apply to the global brightness exposure in relation to the local brightness exposure and/or the shadow exposure.

In many scenarios, first user-adjustable control 735A and the third user-adjustable control 735B are independently moveable on slider 735. Moving first user-adjustable control 735A and/or third user-adjustable control 735B on slider 735 will show the resulting adjustments to the camera's exposure settings in real-time, for example, in a captured image, or in a live-view preview image. Further, the live-view preview image is indicative of the image or video that will be captured if the user taps the image-capture button 745 at that time.

Figure 7C:
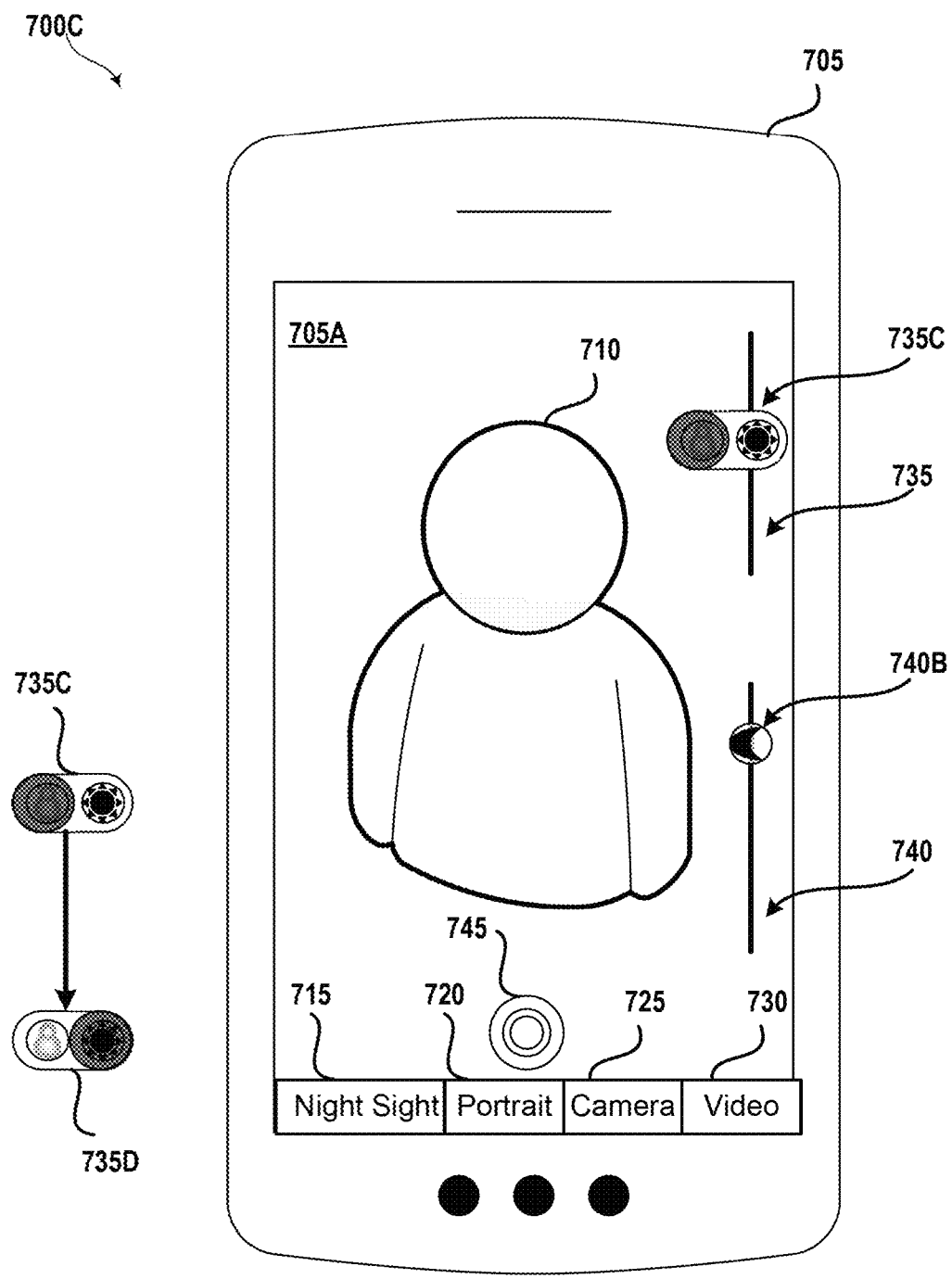
FIG. 7C illustrates another example user interface for adjusting a local brightness exposure level, in accordance with example embodiments.

FIG. 7C illustrates another example user interface 700C for adjusting a local brightness exposure level, in accordance with example embodiments. For example, display component 705A can include first slider 735 with a toggle switch feature that enables a user to toggle between adjusting of the local brightness exposure level and the global brightness exposure level. For example, toggle switch control 735C is illustrated where the toggle switch is positioned to enable an adjustment of the local brightness exposure level, and toggle switch control 735D is illustrated where the toggle switch is positioned to enable an adjustment of the global brightness exposure level. In some embodiments, slider 735 may be configured to include the toggle switch. For example, a user of device 705 can move the toggle switch to turn on the adjustment of the local brightness exposure level. Accordingly, display component 705A can display toggle switch control 735C on slider 735. As the user moves toggle switch control 735C on slider 735, the local brightness exposure level for target region 710 is adjusted. In some embodiments, an upward movement of toggle switch control 735C along first slider 735 may be a user indication to increase local brightness exposure level for the target region. Likewise, downward movement of toggle switch control 735C along first slider 735 may be a user indication to decrease local brightness exposure level for the target region.

Also, for example, the user of device 705 can move the toggle switch to turn on the adjustment of the global brightness exposure level. Accordingly, display component 705A can display toggle switch control 735D on slider 735. As the user moves toggle switch control 735D on slider 735, the global brightness exposure level for non-target region is adjusted. In some embodiments, an upward movement of toggle switch control 735D along first slider 735 may be a user indication to increase global brightness exposure level for the non-target region. Likewise, downward movement of toggle switch control 735D along first slider 735 may be a user indication to decrease global brightness exposure level for the non-target region.

Also, as illustrated, slider 740 can include a user-adjustable control 740B to adjust a desired shadow exposure level. In some embodiments, display component 705A can provide control and visualization of a shadow exposure level and local and global brightness exposure levels, independently from one another, in a live-view preview image. Moving toggle switch control 735C, toggle switch control 735D, and/or user-adjustable control 740B on a respective slider will show the resulting adjustments to the camera's exposure settings in real-time, in the live-view preview image. Further, the live-view preview image is indicative of the image or video that will be captured if the user taps the image-capture button 745 at that time.

It may be noted that additional, and/or alternative user-adjustable controls may be provided to adjust various aspects of displayed image 710. For example, some embodiments may involve providing a fourth user-adjustable control to adjust a desired light direction for the image. Such embodiments may also involve receiving, by the fourth user-adjustable control, a fourth user indication of the desired light direction. Such embodiments may further involve adjusting the desired light direction for the image in response to the second user indication. In some embodiments, the fourth user-adjustable control may include a virtual object configured to be positioned by a user at a desired location of the graphical user interface. For example, a movable circular object can be provided on display component 705A, and a user can move the circular object to adjust a light direction. Moving the circular object will show the resulting adjustments to the camera's exposure settings for a light direction in real-time, in the live-view preview image. Further, the live-view preview image is indicative of the image or video that will be captured if the user taps the image-capture button 745 at that time.

As illustrated, a user-adjustable control to adjust one or more of a shadow exposure level, a local brightness, or a global brightness, may include a slider. However, this is provided for illustrative purposes only. The general idea presented herein is an adjustment to a local brightness exposure level for a target region, where this adjustment can be made in conjunction with various AE settings, such as, for example, an adjustment to a global brightness exposure level for the non-target region, an adjustment to a shadow exposure level, an adjustment to a light direction, an adjustment to color, contrast, sharpness, and so forth.

The user adjustable controls can be positioned at default positions on a slider, and such a default arrangement may be mapped to respective auto-exposure settings (for a local brightness exposure level, a global brightness exposure level, a shadow exposure level, and so forth). Such auto-exposure settings can be determined by a real-time image-processing pipeline for the camera of device 705.

For instance, an auto-exposure process may determine a first exposure setting, which controls the exposure settings for image capture, absent further input from the user. In an example embodiment, the first exposure setting may indicate a total exposure time (TET) for the entire image frame (e.g., a global exposure, if no other adjustments are made by the user). This exposure time can be implemented by setting the amount of analog gain (e.g., sensitivity of the image sensor), and digital gain (e.g., gain applied to image data that has been generated by the image sensor). In implementations, the TET used to capture an image (e.g., a "capture TET") may also be used as the exposure level for the target region in an image, and thus may also be referred to as the "target TET." A longer TET can be determined for shadow areas, which can be implemented by applying additional gain to the target TET. As such, the target TET may also be characterized as the "short" TET, and the shadow TET may be characterized as the "long" TET.

Referring to an image-capture interface, this interface may also allow the user to adjust the exposure for shadow areas separately from the target region, before image capture. As such, the first exposure setting can effectively provide a mechanism for adjusting the target region, without adjusting the shadow areas. As such, the first user-adjustable control may allow for control of local brightness exposure level, separately from a shadow exposure level. Correspondingly, the second exposure setting may indicate a second TET for shadows. As such, the user-adjustable control for shadow may allow for adjustment of a second TET, which is implemented by applying additional gain (e.g., digital gain) to shadow areas in the image frame. Thus, in most scenarios, adjusting the second TET will effectively adjust the exposure of shadows in the live-view preview image (and an image that is captured via shutter button), with little to no effect on the exposure of highlights in the same image.

In some embodiments, a camera device or a control device communicatively coupled thereto may include physical controls that are mapped to control the user-adjustable controls (or perhaps control the exposure settings directly, without any feedback from a graphic interface). For example, a DSLR or another type of camera could include a live-view interface, as well as mechanical control features, such as control knob(s), joystick(s), button(s) and/or slider(s). These mechanical control features could allow for control of the exposure settings in real-time, such that changes to these settings are represented accurately in the live-view interface.

Some embodiments may involve capturing the image subsequent to the adjusting of the local brightness exposure level of the target region.

In some embodiments, the image may include two or more target regions (e.g., two or more faces), and a user may separately adjust a local brightness level for each of the two or more target regions.

Computing Device Architecture

Figure 8:
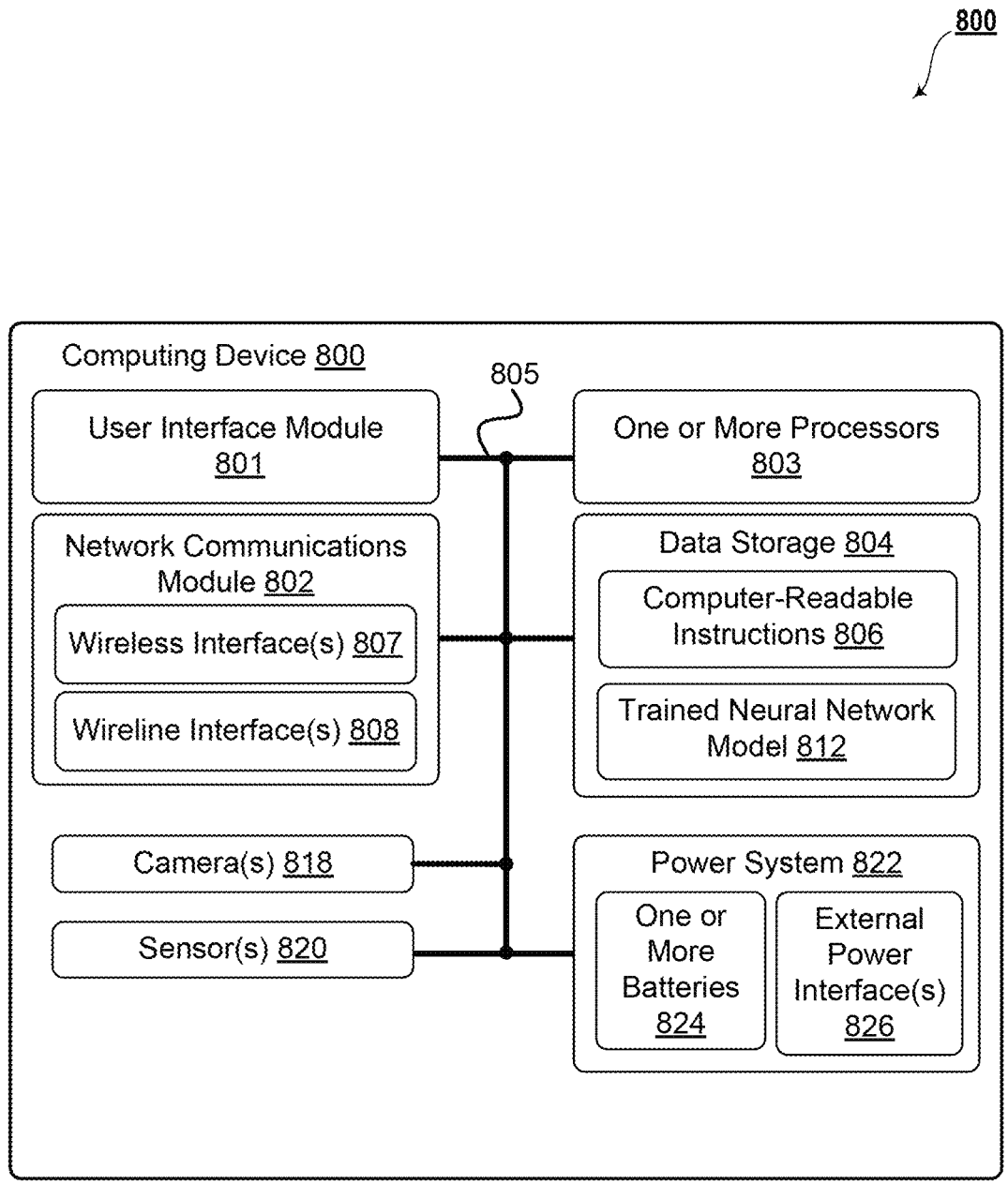
FIG. 8 is a block diagram of an example computing device, in accordance with example embodiments.

FIG. 8 is a block diagram of an example computing device 800, in accordance with example embodiments. In particular, computing device 800 shown in FIG. 8 can be configured to perform at least one function of and/or related to a convolutional neural network, a HDRnet, a facial recognition algorithm, an object detection algorithm, a classification model, and/or method 1200.

Computing device 800 may include a user interface module 801, a network communications module 802, one or more processors 803, data storage 804, one or more cameras 818, one or more sensors 820, and power system 822, all of which may be linked together via a system bus, network, or other connection mechanism 805.

User interface module 801 can be operable to send data to and/or receive data from external user input/output devices. For example, user interface module 801 can be configured to send and/or receive data to and/or from user input devices such as a touch screen, a computer mouse, a keyboard, a keypad, a touch pad, a trackball, a joystick, a voice recognition module, and/or other similar devices. User interface module 801 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 801 can also be configured to generate audible outputs, with devices such as a speaker, speaker jack, audio output port, audio output device, earphones, and/or other similar devices. User interface module 801 can further be configured with one or more haptic devices that can generate haptic outputs, such as vibrations and/or other outputs detectable by touch and/or physical contact with computing device 800. In some examples, user interface module 801 can be used to provide a graphical user interface (GUI) for utilizing computing device 800, such as, for example, a graphical user interface illustrated in any of FIGS. 7A-7C.

Network communications module 802 can include one or more devices that provide one or more wireless interfaces 807 and/or one or more wireline interfaces 808 that are configurable to communicate via a network. Wireless interface(s) 807 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 802 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 803 can include one or more general purpose processors (e.g., central processing unit (CPU), etc.), and/or one or more special purpose processors (e.g., digital signal processors, tensor processing units (TPUs), graphics processing units (GPUs), application specific integrated circuits, etc.). One or more processors 803 can be configured to execute computer-readable instructions 806 that are contained in data storage 804 and/or other instructions as described herein.

Data storage 804 can include one or more non-transitory computer-readable storage media that can be read and/or accessed by at least one of one or more processors 803. The one or more computer-readable storage media can include volatile and/or non-volatile storage components, such as optical, magnetic, organic or other memory or disc storage, which can be integrated in whole or in part with at least one of one or more processors 803. In some examples, data storage 804 can be implemented using a single physical device (e.g., one optical, magnetic, organic or other memory or disc storage unit), while in other examples, data storage 804 can be implemented using two or more physical devices.

Data storage 804 can include computer-readable instructions 806 and perhaps additional data. In some examples, data storage 804 can include storage required to perform at least part of the herein-described methods, scenarios, and techniques and/or at least part of the functionality of the herein-described devices and networks. In some examples, data storage 804 can include storage for a trained neural network model 812 (e.g., a model of trained convolutional neural networks such as first HDRnet 525, second HDRnet 535). In particular of these examples, computer-readable instructions 806 can include instructions that, when executed by processor(s) 803, enable computing device 800 to provide for some or all of the functionality of trained neural network model 812.

In some examples, computing device 800 can include one or more cameras 818. Camera(s) 818 can include one or more image capture devices, such as still and/or video cameras, equipped to capture light and record the captured light in one or more images; that is, camera(s) 818 can generate image(s) of captured light. The one or more images can be one or more still images and/or one or more images utilized in video imagery. Camera(s) 818 can capture light and/or electromagnetic radiation emitted as visible light, infrared radiation, ultraviolet light, and/or as one or more other frequencies of light.

In some examples, computing device 800 can include one or more sensors 820. Sensors 820 can be configured to measure conditions within computing device 800 and/or conditions in an environment of computing device 800 and provide data about these conditions. For example, sensors 820 can include one or more of: (i) sensors for obtaining data about computing device 800, such as, but not limited to, a thermometer for measuring a temperature of computing device 800, a battery sensor for measuring power of one or more batteries of power system 822, and/or other sensors measuring conditions of computing device 800; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 800, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 800, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 800, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 820 are possible as well.

Power system 822 can include one or more batteries 824 and/or one or more external power interfaces 826 for providing electrical power to computing device 800. Each battery of the one or more batteries 824 can, when electrically coupled to the computing device 800, act as a source of stored electrical power for computing device 800. One or more batteries 824 of power system 822 can be configured to be portable. Some or all of one or more batteries 824 can be readily removable from computing device 800. In other examples, some or all of one or more batteries 824 can be internal to computing device 800, and so may not be readily removable from computing device 800. Some or all of one or more batteries 824 can be rechargeable. For example, a rechargeable battery can be recharged via a wired connection between the battery and another power supply, such as by one or more power supplies that are external to computing device 800 and connected to computing device 800 via the one or more external power interfaces. In other examples, some or all of one or more batteries 824 can be non-rechargeable batteries.

One or more external power interfaces 826 of power system 822 can include one or more wired-power interfaces, such as a USB cable and/or a power cord, that enable wired electrical power connections to one or more power supplies that are external to computing device 800. One or more external power interfaces 826 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 826, computing device 800 can draw electrical power from the external power source the established electrical power connection. In some examples, power system 822 can include related sensors, such as battery sensors associated with the one or more batteries or other types of electrical power sensors.

One or more external power interfaces 826 of power system 822 can include one or more wired-power interfaces, such as a USB cable and/or a power cord, that enable wired electrical power connections to one or more power supplies that are external to computing device 800. One or more external power interfaces 826 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 826, computing device 800 can draw electrical power from the external power source the established electrical power connection. In some examples, power system 822 can include related sensors, such as battery sensors associated with the one or more batteries or other types of electrical power sensors.

Training Machine Learning Models for Generating Inferences/Predictions

Figure 9:
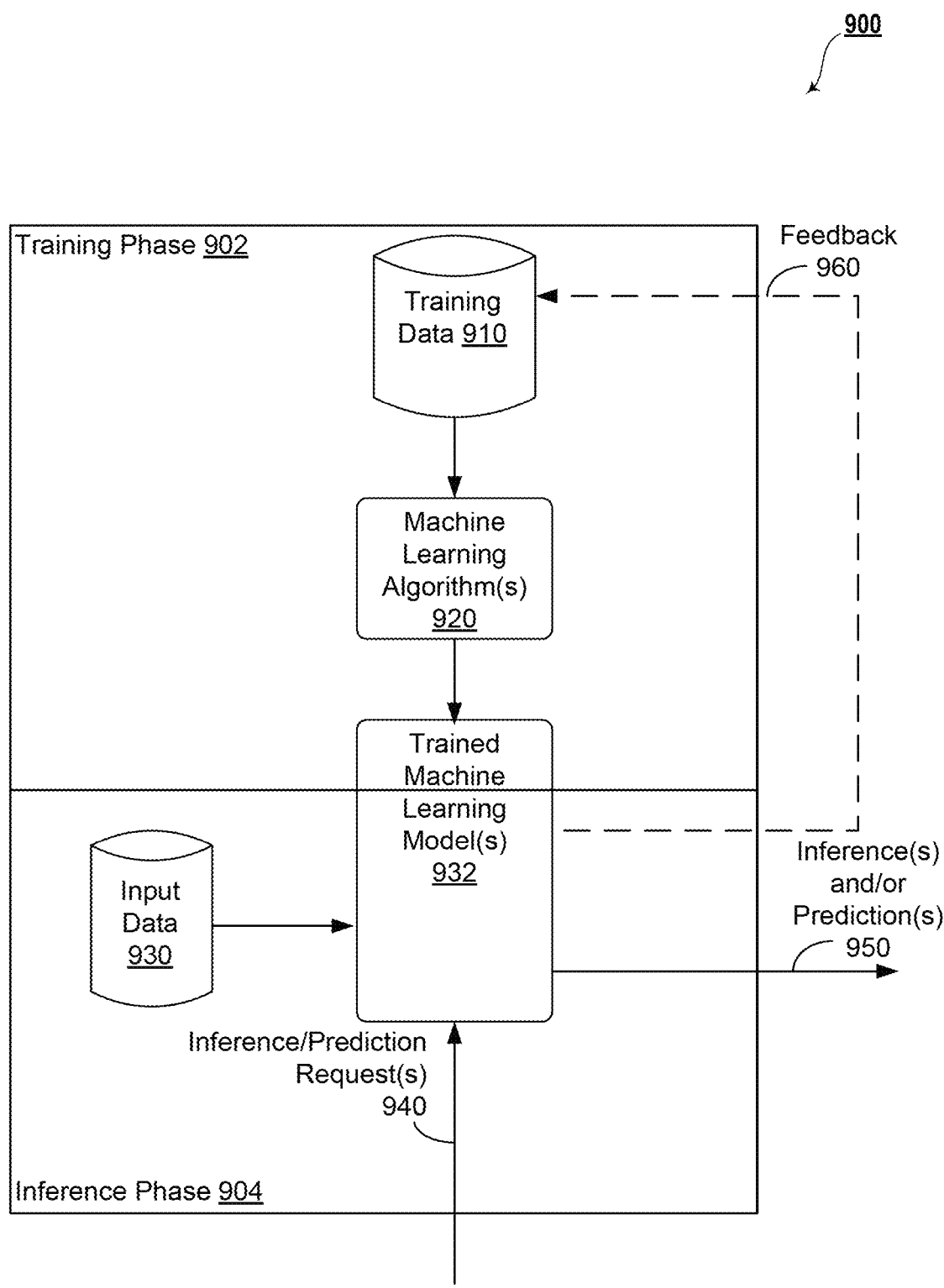
FIG. 9 is a diagram illustrating training and inference phases of a machine learning model, in accordance with example embodiments.

FIG. 9 is a diagram illustrating training and inference phases of a machine learning model, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 9 shows training phase 902 where one or more machine learning algorithms 920 are being trained on training data 910 to become trained machine learning model(s) 932. Then, during inference phase 904, trained machine learning model(s) 932 can receive input data 930 and one or more inference/prediction requests 940 (perhaps as part of input data 930) and responsively provide as an output one or more inferences and/or prediction(s) 950.

As such, trained machine learning model(s) 932 can include one or more models of one or more machine learning algorithms 920. Machine learning algorithm(s) 920 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 920 may be supervised or unsupervised, and may implement any suitable combination of online and offline learning.

As described herein, machine learning algorithms 920 can include an object detection algorithm to detect an object in an image. For example, the object detection algorithm can be trained to identify objects as primary objects, secondary objects, and so forth. Also, for example, the object detection algorithm can be trained to identify objects such as automobiles, pets, trains, aircrafts, trees, lampposts, light sources, known landmarks, and so forth. Machine learning algorithms 920 can also include a facial recognition algorithm to detect one or more human faces in an image. For example, a user's library of images can include images of individuals that may occur frequently, and the facial recognition algorithm can be trained to identify such individuals.

Machine learning algorithms 920 can also include a HDRnet to generate a segmentation mask. For example, local segmentation may involve applying a CNN, such as, for example, a U-net, or a Mask R-CNN. Machine learning algorithms 920 can also include semantic segmentation that takes an image as input and outputs a binary segmentation mask that classifies pixels based on predefined classes (e.g., whether the pixels belong to a target region).

In some embodiments, machine learning algorithms 920 can include a classification and/or pattern detection algorithm that analyzes a history of user preferences, and/or a history of past user activity, to predict user preferences, and/or future user activity. In some embodiments, machine learning algorithms 920 may be utilized to detect and analyze patterns from the history of user preferences, and the user-selectable portions may be determined based on the identified patterns. Machine learning algorithms 920 can also include a portrait relighting algorithm to apply a directional lighting to an image.

In some examples, machine learning algorithm(s) 920 and/or trained machine learning model(s) 932 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 920 and/or trained machine learning model(s) 932. In some examples, trained machine learning model(s) 932 can be trained, reside and execute to provide inferences on a particular computing device, and/or otherwise can make inferences for the particular computing device.

During training phase 902, machine learning algorithm(s) 920 can be trained by providing at least training data 910 as training input using unsupervised, supervised, semi-supervised, and/or reinforcement learning techniques. Unsupervised learning involves providing a portion (or all) of training data 910 to machine learning algorithm(s) 920 and machine learning algorithm(s) 920 determining one or more output inferences based on the provided portion (or all) of training data 910. Supervised learning involves providing a portion of training data 910 to machine learning algorithm(s) 920, with machine learning algorithm(s) 920 determining one or more output inferences based on the provided portion of training data 910, and the output inference(s) are either accepted or corrected based on correct results associated with training data 910. In some examples, supervised learning of machine learning algorithm(s) 920 can be governed by a set of rules and/or a set of labels for the training input, and the set of rules and/or set of labels may be used to correct inferences of machine learning algorithm(s) 920.

Semi-supervised learning involves having correct results for part, but not all, of training data 910. During semi-supervised learning, supervised learning is used for a portion of training data 910 having correct results, and unsupervised learning is used for a portion of training data 910 not having correct results. Reinforcement learning involves machine learning algorithm(s) 920 receiving a reward signal regarding a prior inference, where the reward signal can be a numerical value. During reinforcement learning, machine learning algorithm(s) 920 can output an inference and receive a reward signal in response, where machine learning algorithm(s) 920 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 920 and/or trained machine learning model(s) 932 can be trained using other machine learning techniques, including but not limited to, incremental learning and curriculum learning.

In some examples, machine learning algorithm(s) 920 and/or trained machine learning model(s) 932 can use transfer learning techniques. For example, transfer learning techniques can involve trained machine learning model(s) 932 being pre-trained on one set of data and additionally trained using training data 910. More particularly, machine learning algorithm(s) 920 can be pre-trained on data from one or more computing devices and a resulting trained machine learning model provided to a first computing device, CD1, where CD1 is intended to execute the trained machine learning model during inference phase 904. Then, during training phase 902, the pre-trained machine learning model can be additionally trained using training data 910, where training data 910 can be derived from kernel and non-kernel data of CD1. This further training of the machine learning algorithm(s) 920 and/or the pre-trained machine learning model using training data 910 of CD1's data can be performed using either supervised or unsupervised learning. Once machine learning algorithm(s) 920 and/or the pre-trained machine learning model has been trained on at least training data 910, training phase 902 can be completed. The trained resulting machine learning model can be utilized as at least one of trained machine learning model(s) 932.

In particular, once training phase 902 has been completed, trained machine learning model(s) 932 can be provided to a computing device, if not already on the computing device. Inference phase 904 can begin after trained machine learning model(s) 932 are provided to computing device CD1.

During inference phase 904, trained machine learning model(s) 932 can receive input data 930 and generate and output one or more corresponding inferences and/or prediction(s) 950 about input data 930. As such, input data 930 can be used as an input to trained machine learning model(s) 932 for providing corresponding inference(s) and/or prediction(s) 950 to kernel components and non-kernel components. For example, trained machine learning model(s) 932 can generate inference(s) and/or prediction(s) 950 in response to one or more inference/prediction requests 940. In some examples, trained machine learning model(s) 932 can be executed by a portion of other software. For example, trained machine learning model(s) 932 can be executed by an inference or prediction daemon to be readily available to provide inferences and/or predictions upon request. Input data 930 can include data from computing device CD1 executing trained machine learning model(s) 932 and/or input data from one or more computing devices other than CD1.

Input data 930 can include training data described herein. Other types of input data are possible as well.

Inference(s) and/or prediction(s) 950 can include task outputs, numerical values, and/or other output data produced by trained machine learning model(s) 932 operating on input data 930 (and training data 910). In some examples, trained machine learning model(s) 932 can use output inference(s) and/or prediction(s) 950 as input feedback 960. Trained machine learning model(s) 932 can also rely on past inferences as inputs for generating new inferences.

After training, the trained version of the neural network can be an example of trained machine learning model(s) 932. In this approach, an example of the one or more inference/prediction request(s) 940 can be a request to predict a modeling task output for input screenshot and a corresponding example of inferences and/or prediction(s) 950 can be a predicted task output.

In some examples, one computing device, CD_SOLO, can include the trained version of the neural network, perhaps after training. Then, CD_SOLO can receive a request to predict a modeling task output, and use the trained version of the neural network to predict the modeling task output.

In some examples, two or more computing devices, CD_CLI and CD_SRV, can be used to provide output images; e.g., a first computing device CD_CLI can generate and send requests to predict a modeling task output to a second computing device CD_SRV. Then, CD_SRV can use the trained version of the neural network, to predict the modeling task output, and respond to the requests from CD_CLI for the output class. Then, upon reception of responses to the requests, CD_CLI can provide the requested output (e.g., using a user interface and/or a display, a printed copy, an electronic communication, etc.).

Example Data Network

Figure 10:
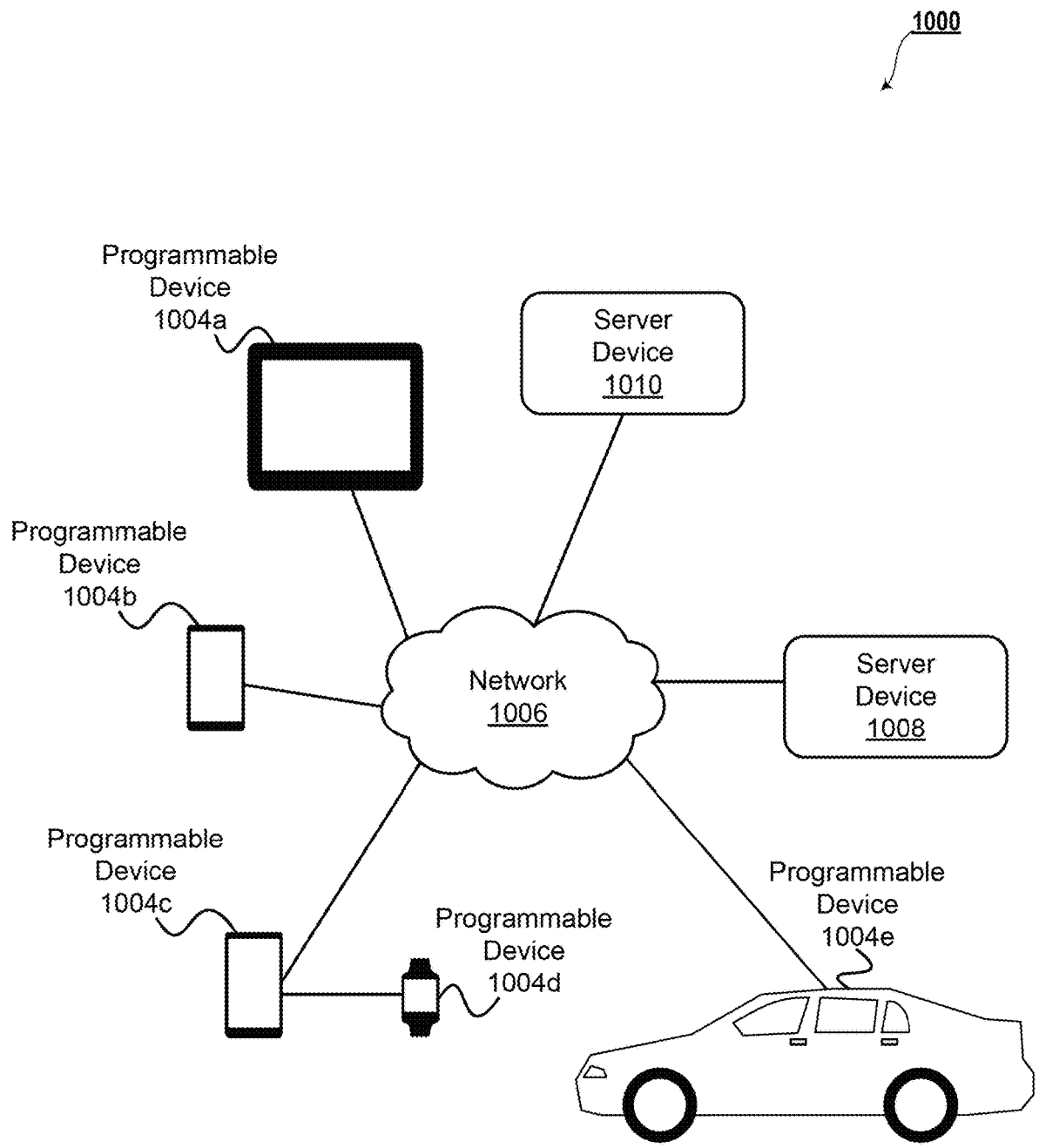
FIG. 10 depicts a distributed computing architecture, in accordance with example embodiments.

FIG. 10 depicts a distributed computing architecture, in accordance with example embodiments. Distributed computing architecture 1000 includes server devices 1008, 1010 that are configured to communicate, via network 1006, with programmable devices 1004a, 1004b, 1004c, 1004d, 1004e. Network 1006 may correspond to a local area network (LAN), a wide area network (WAN), a WLAN, a WWAN, a corporate intranet, the public Internet, or any other type of network configured to provide a communications path between networked computing devices. Network 1006 may also correspond to a combination of one or more LANs, WANs, corporate intranets, and/or the public Internet.

Although FIG. 10 only shows five programmable devices, distributed application architectures may serve tens, hundreds, or thousands of programmable devices. Moreover, programmable devices 1004a, 1004b, 1004c, 1004d, 1004e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1004a, 1004b, 1004c, 1004e, programmable devices can be directly connected to network 1006. In other examples, such as illustrated by programmable device 1004d, programmable devices can be indirectly connected to network 1006 via an associated computing device, such as programmable device 1004c. In this example, programmable device 1004c can act as an associated computing device to pass electronic communications between programmable device 1004d and network 1006. In other examples, such as illustrated by programmable device 1004e, a computing device can be part of and/or inside a vehicle, such as a car, a truck, a bus, a boat or ship, an airplane, etc. In other examples not shown in FIG. 10, a programmable device can be both directly and indirectly connected to network 1006.

Server devices 1008, 1010 can be configured to perform one or more services, as requested by programmable devices 1004a-1004e. For example, server device 1008 and/or 1010 can provide content to programmable devices 1004a-1004e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1008 and/or 1010 can provide programmable devices 1004a-1004e with access to software for database, search, computation, graphical, audio, video, World Wide Web/Internet utilization, and/or other functions. Many other examples of server devices are possible as well.

Cloud-Based Servers

Figure 11:
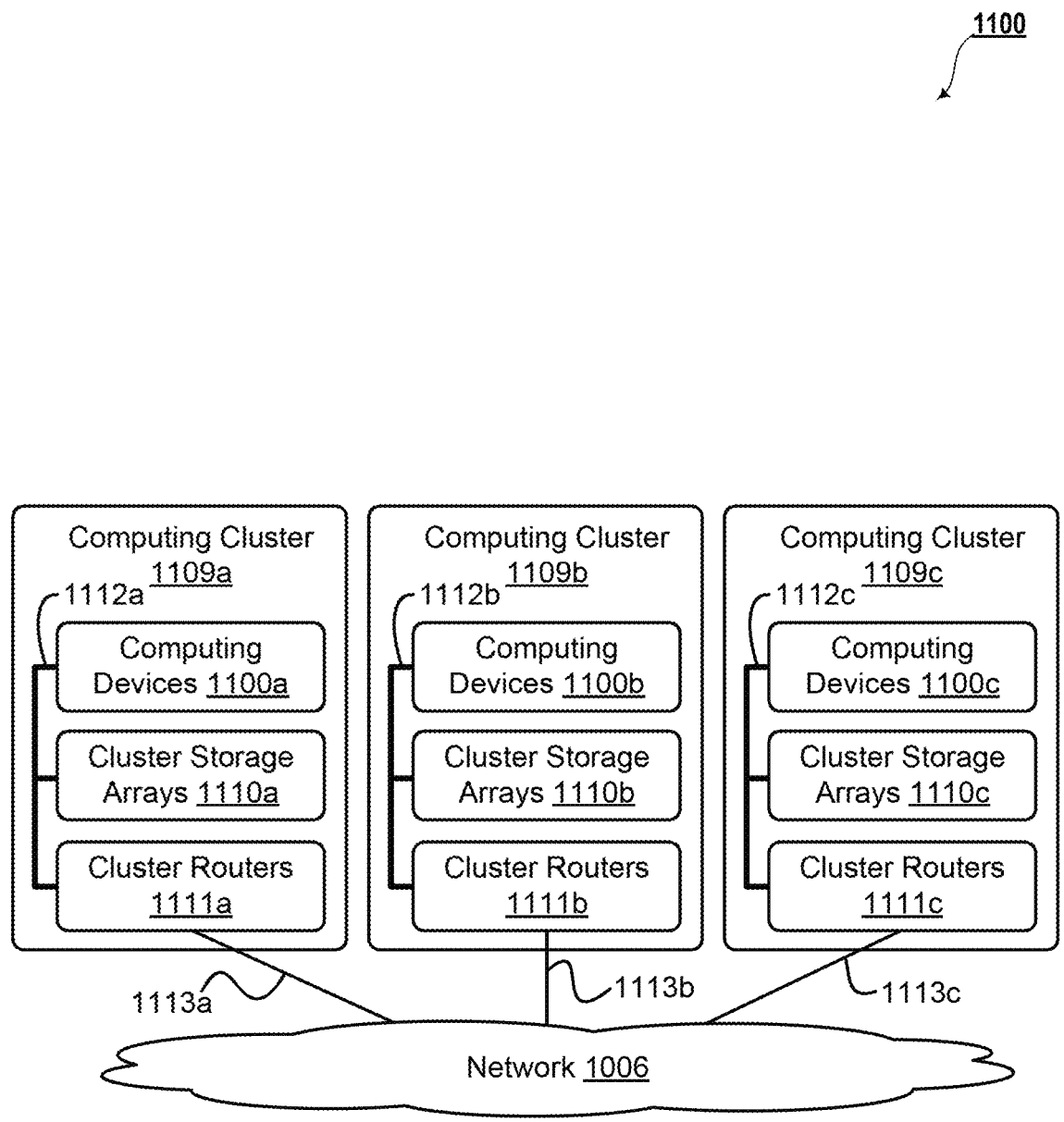
FIG. 11 depicts a network of computing clusters arranged as a cloud-based server system, in accordance with example embodiments.

FIG. 11 depicts a network of computing clusters arranged as a cloud-based server system, in accordance with example embodiments. In FIG. 11, functionality of a neural network, and/or a computing device can be distributed among computing clusters 1109a, 1109b, 1109c. Computing cluster 1109a can include one or more computing devices 1100a, cluster storage arrays 1110a, and cluster routers 1111a connected by a local cluster network 1112a. Similarly, computing cluster 1109b can include one or more computing devices 1100b, cluster storage arrays 1110b, and cluster routers 1111b connected by a local cluster network 1112b. Likewise, computing cluster 1109c can include one or more computing devices 1100c, cluster storage arrays 1110c, and cluster routers 1111c connected by a local cluster network 1112c.

In some embodiments, computing clusters 1109a, 1109b, 1109c can be a single computing device residing in a single computing center. In other embodiments, computing clusters 1109a, 1109b, 1109c can include multiple computing devices in a single computing center, or even multiple computing devices located in multiple computing centers located in diverse geographic locations. For example, FIG. 11 depicts each of computing clusters 1109a, 1109b, 1109c residing in different physical locations.

In some embodiments, data and services at computing clusters 1109a, 1109b, 1109c can be encoded as computer readable information stored in non-transitory, tangible computer readable media (or computer readable storage media) and accessible by other computing devices. In some embodiments, computing clusters 1109a, 1109b, 1109c can be stored on a single disk drive or other tangible storage media, or can be implemented on multiple disk drives or other tangible storage media located at one or more diverse geographic locations.

In some embodiments, each of computing clusters 1109a, 1109b, and 1109c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1109a, for example, computing devices 1100a can be configured to perform various computing tasks of a conditioned, axial self-attention based neural network, and/or a computing device. In one embodiment, the various functionalities of a neural network, and/or a computing device can be distributed among one or more of computing devices 1100a, 1100b, 1100c. Computing devices 1100b and 1100c in respective computing clusters 1109b and 1109c can be configured similarly to computing devices 1100a in computing cluster 1109a. On the other hand, in some embodiments, computing devices 1100a, 1100b, and 1100c can be configured to perform different functions.

In some embodiments, computing tasks and stored data associated with a neural network, and/or a computing device can be distributed across computing devices 1100a, 1100b, and 1100c based at least in part on the processing requirements of a neural network, and/or a computing device, the processing capabilities of computing devices 1100a, 1100b, 1100c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1110a, 1110b, 1110c of computing clusters 1109a, 1109b, 1109c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a conditioned, axial self-attention based neural network, and/or a computing device can be distributed across computing devices 1100a, 1100b, 1100c of computing clusters 1109a, 1109b, 1109c, various active portions and/or backup portions of these components can be distributed across cluster storage arrays 1110a, 1110b, 1110c. For example, some cluster storage arrays can be configured to store one portion of the data of a first layer of a neural network, and/or a computing device, while other cluster storage arrays can store other portion(s) of data of second layer of a neural network, and/or a computing device. Also, for example, some cluster storage arrays can be configured to store the data of an encoder of a neural network, while other cluster storage arrays can store the data of a decoder of a neural network. Additionally, some cluster storage arrays can be configured to store backup versions of data stored in other cluster storage arrays.

Cluster routers 1111a, 1111b, 1111c in computing clusters 1109a, 1109b, 1109c can include networking equipment configured to provide internal and external communications for the computing clusters. For example, cluster routers 1111a in computing cluster 1109a can include one or more internet switching and routing devices configured to provide (i) local area network communications between computing devices 1100a and cluster storage arrays 1110a via local cluster network 1112a, and (ii) wide area network communications between computing cluster 1109a and computing clusters 1109b and 1109c via wide area network link 1113a to network 1006. Cluster routers 1111b and 1111c can include network equipment similar to cluster routers 1111a, and cluster routers 1111b and 1111c can perform similar networking functions for computing clusters 1109b and 1109b that cluster routers 1111a perform for computing cluster 1109a.

In some embodiments, the configuration of cluster routers 1111a, 1111b, 1111c can be based at least in part on the data communication requirements of the computing devices and cluster storage arrays, the data communications capabilities of the network equipment in cluster routers 1111a, 1111b, 1111c, the latency and throughput of local cluster networks 1112a, 1112b, 1112c, the latency, throughput, and cost of wide area network links 1113a, 1113b, 1113c, and/or other factors that can contribute to the cost, speed, fault-tolerance, resiliency, efficiency and/or other design criteria of the moderation system architecture.

Example Methods of Operation

Figure 12:
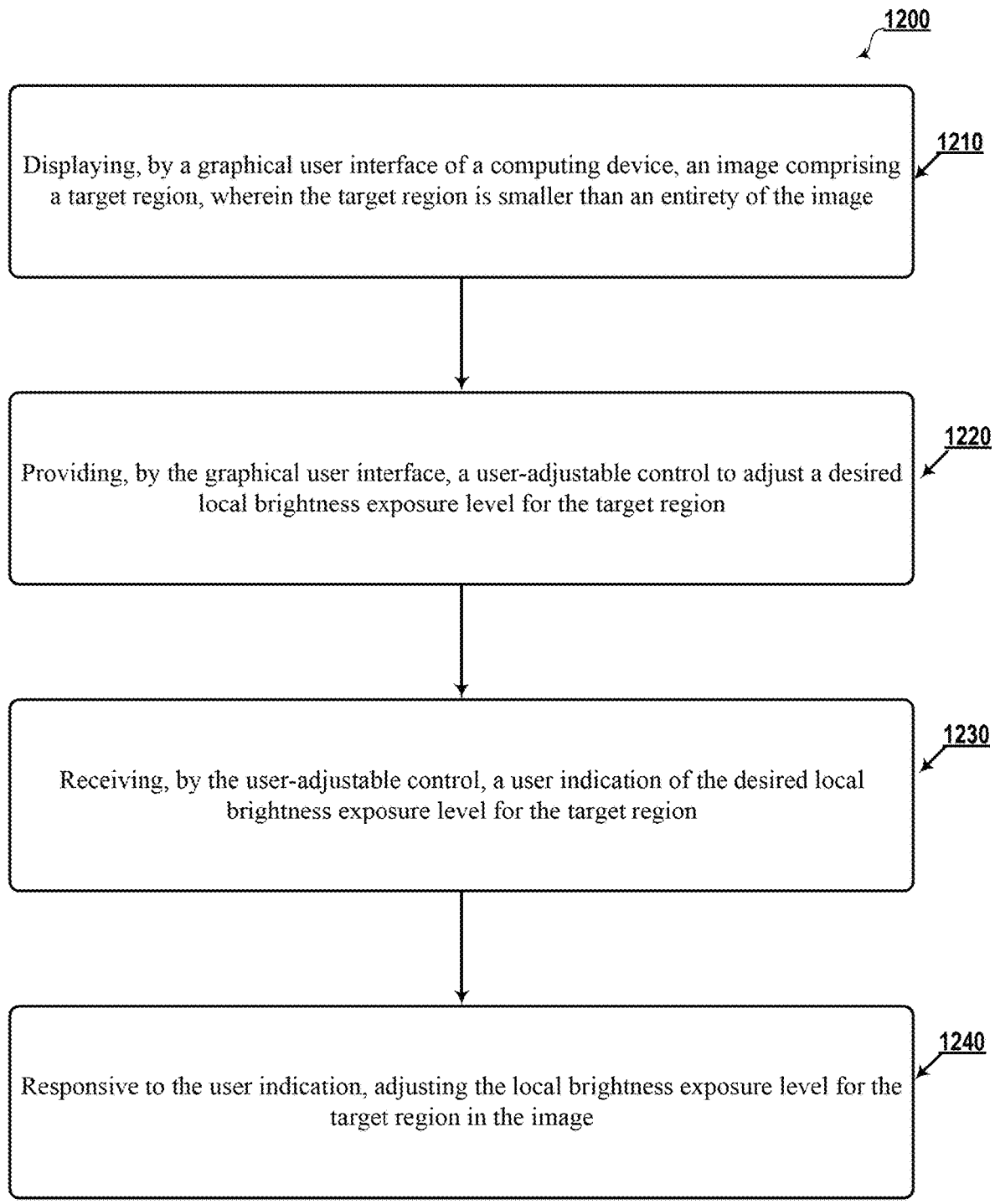
FIG. 12 is a flowchart of a method, in accordance with example embodiments.

FIG. 12 is a flowchart of a method, in accordance with example embodiments. Method 1200 may include various blocks or steps. The blocks or steps may be carried out individually or in combination. The blocks or steps may be carried out in any order and/or in series or in parallel. Further, blocks or steps may be omitted or added to method 1200.

The blocks of method 1200 may be carried out by various elements of computing device 800 as illustrated and described in reference to FIG. 8. Furthermore, method 1200 may utilize the relationships that are illustrated and described with regard to FIGS. 2 and 3.

Block 1210 includes displaying, by a graphical user interface of a computing device, an image comprising a target region, wherein the target region is smaller than an entirety of the image.

In some embodiments, the displaying of the image may involve displaying the image captured by a camera.

In some embodiments, the displaying of the image may involve providing a live-view preview of the image prior to a capture of the image.

In some embodiments, the computing device may be a mobile device.

In some embodiments, the image may be a frame of a plurality of frames of a video.

In some embodiments, the target region may include a portrait.

Block 1220 includes providing, by the graphical user interface, a user-adjustable control to adjust a desired local brightness exposure level for the target region.

In some embodiments, the graphical user interface may initially display an initial user-adjustable control to adjust a desired shadow exposure level.

In such embodiments, the providing of the user-adjustable control to adjust the desired local brightness exposure level may involve detecting, by the graphical user interface, that the target region comprises a human portrait. Such embodiments may further involve automatically replacing, based on the detecting, the initial user-adjustable control to adjust the desired shadow exposure level to the user-adjustable control to adjust the desired local brightness exposure level for the human portrait. Such embodiments may also involve providing, by the graphical user interface, a toggle button to receive a user indication whether to perform the automatic replacing of the initial user-adjustable control.

Some embodiments may involve providing, by the graphical user interface, the target region as a user-selectable portion of the image, wherein the user selectable portion is determined by applying machine learning based semantic segmentation. Such embodiments may also involve receiving, by the graphical user interface, a user selection of the user-selectable portion of the image. The providing of the user-adjustable control may be in response to the user selection.

Block 1230 includes receiving, by the user-adjustable control, a user indication of the desired local brightness exposure level for the target region.

Block 1240 includes adjusting the local brightness exposure level for the target region in the image in response to the user indication.

In some embodiments, the adjusting of the local brightness exposure level for the target region may be based on a bilateral grid adjustment to reduce a halo artifact in the image. Such embodiments may involve applying a machine learning model to generate a first bilateral grid for the target region. Such embodiments may also involve applying the machine learning model to generate a second bilateral grid for an entirety of the image outside the target region. The bilateral grid adjustment may be based on a combination of the first bilateral grid and the second bilateral grid.

Such embodiments may further involve generating a low resolution segmentation mask for the target image. The combination of the first bilateral grid and the second bilateral grid may include the segmentation mask for the target image.

Some embodiments may involve providing, by the graphical user interface, a second user-adjustable control to adjust a desired global brightness exposure level for the image. Such embodiments may also involve receiving, by the second user-adjustable control, a second user indication of the desired global brightness exposure level. Such embodiments may further involve adjusting the global brightness exposure level for the image in response to the fourth user indication.

Some embodiments may involve providing, by the graphical user interface, a third user-adjustable control to adjust a desired shadow exposure level for the image. Such embodiments may also involve receiving, by the third user-adjustable control, a third user indication of the desired shadow exposure level. Such embodiments may further involve adjusting the desired shadow exposure level for the image in response to the third user indication.

Some embodiments may involve providing, by the graphical user interface, a fourth user-adjustable control to adjust a desired light direction for the image. Such embodiments may also involve receiving, by the fourth user-adjustable control, a fourth user indication of the desired light direction. Such embodiments may further involve adjusting the desired light direction for the image in response to the second user indication.

In some embodiments, the second user-adjustable control may include a virtual object configured to be positioned by a user at a desired location of the graphical user interface.

In some embodiments, a user-adjustable control to adjust one or more of a shadow exposure level, a local brightness, or a global brightness, may include a slider.

Some embodiments may involve capturing the image subsequent to the adjusting of the local brightness exposure level of the target region.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods. Thus, the computer readable media may include secondary or persistent long-term storage, like read only memory (ROM), optical or magnetic disks, compact disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A computer-implemented method, comprising:
    detecting, by a computing device, an object of interest in an image;
    displaying, by a graphical user interface of the computing device, the image comprising the detected object of interest, and the image having an initial brightness exposure level;
    providing, by the graphical user interface, a user-adjustable control to adjust a desired local brightness exposure level for the detected object of interest;
    receiving, by the user-adjustable control, a user indication of the desired local brightness exposure level for the detected object of interest; and
    responsive to the user indication, adjusting the local brightness exposure level for the detected object of interest, while maintaining the initial brightness exposure level for the entirety of the image outside the detected object of interest, and wherein the adjusting is based on a bilateral grid adjustment by:
        applying a machine learning model to generate a first bilateral grid for the target region,
        applying the machine learning model to generate a second bilateral grid for a portion of the image outside the target region, and
        wherein the bilateral grid adjustment is based on a combination of the first bilateral grid and the second bilateral grid.

2. The computer-implemented method of claim 1, wherein the detected object of interest comprises a portrait.

3. The computer-implemented method of claim 1, wherein the displaying of the image comprises providing a live-view preview of the image prior to a capture of the image.

4. The computer-implemented method of claim 3, further comprising:
    capturing the image subsequent to the adjusting of the local brightness exposure level of the detected object of interest.

5. The computer-implemented method of claim 1, wherein the displaying of the image comprises displaying the image captured by a camera.

6. The computer-implemented method of claim 1, further comprising:
    providing, by the graphical user interface, a second user-adjustable control to adjust a desired global brightness exposure level for the image;
    receiving, by the second user-adjustable control, a second user indication of the desired global brightness exposure level; and
    responsive to the second user indication, adjusting the global brightness exposure level for the image.

7. The computer-implemented method of claim 1, further comprising:
    providing, by the graphical user interface, a third user-adjustable control to adjust a desired shadow exposure level for the image;

receiving, by the third user-adjustable control, a third user indication of the desired shadow exposure level; and responsive to the third user indication, adjusting the desired shadow exposure level for the image.

8. The computer-implemented method of claim 1, further comprising:

providing, by the graphical user interface, a fourth user-adjustable control to adjust a desired light direction for the image;

receiving, by the fourth user-adjustable control, a fourth user indication of the desired light direction; and responsive to the fourth user indication, adjusting the desired light direction for the image.

9. The computer-implemented method of claim 8, wherein the fourth user-adjustable control comprises a virtual object configured to be positioned by a user at a desired location of the graphical user interface.

10. The computer-implemented method of claim 1, wherein the graphical user interface initially displays an initial user-adjustable control to adjust a desired shadow exposure level, and wherein the providing of the user-adjustable control to adjust the desired local brightness exposure level comprises:

detecting, by the graphical user interface, that the detected object of interest comprises a human portrait;

based on the detecting, automatically replacing the initial user-adjustable control to adjust the desired shadow exposure level to the user-adjustable control to adjust the desired local brightness exposure level for the human portrait.

11. The computer-implemented method of claim 10, further comprising:

providing, by the graphical user interface, a toggle button to receive a user indication of whether to perform the automatic replacing of the initial user-adjustable control.

12. The computer-implemented method of claim 1, wherein a user-adjustable control to adjust one or more of a shadow exposure level, a local brightness, or a global brightness, comprises a slider.

13. The computer-implemented method of claim 1, further comprising:

providing, by the graphical user interface, a target region as a user-selectable portion of the image, wherein the target region is determined by applying machine learning based semantic segmentation; and receiving, by the graphical user interface, a user selection of the user-selectable portion of the image to adjust a brightness exposure level for the target region, and wherein the providing of the user-adjustable control is in response to the user selection.

14. The computer-implemented method of claim 1, wherein the adjusting of the local brightness exposure level for the detected object of interest is based on the bilateral grid adjustment to reduce a halo artifact in the image.

15. The computer-implemented method of claim 1, further comprising:

generating a low resolution segmentation mask for the detected object of interest, and wherein the combination of the first bilateral grid and the second bilateral grid comprises the low resolution segmentation mask for the detected object of interest.

16. The computer-implemented method of claim 1, wherein the computing device is a mobile device.

17. The computer-implemented method of claim 1, wherein the image is a frame of a plurality of frames of a video.

18. The computer-implemented method of claim 1, wherein the combination of the first bilateral grid and the second bilateral grid is based on a splatted segmentation mask.

19. A computing device, comprising:

one or more processors; and data storage, wherein the data storage has stored thereon computer-executable instructions that, when executed by the one or more processors, cause the computing device to carry out functions comprising:

displaying, by a graphical user interface of the computing device, an image comprising a target region, wherein the target region is smaller than an entirety of the image;

providing, by the graphical user interface, a user-adjustable control to adjust a desired local brightness exposure level of the target region;

receiving, by the user-adjustable control, a user indication of the desired level of brightness of the target region; and responsive to the user indication, adjusting the local brightness exposure level of the target region in the image based on a bilateral grid adjustment by:

applying a machine learning model to generate a first bilateral grid for the target region, applying the machine learning model to generate a second bilateral grid for a portion of the image outside the target region, and wherein the bilateral grid adjustment is based on a combination of the first bilateral grid and the second bilateral grid.

20. An article of manufacture comprising one or more computer readable media having computer-readable instructions stored thereon that, when executed by one or more processors of a computing device, cause the computing device to carry out functions comprising:

displaying, by a graphical user interface of the computing device, an image comprising a target region, wherein the target region is smaller than an entirety of the image;

providing, by the graphical user interface, a user-adjustable control to adjust a desired local brightness exposure level of the target region;

receiving, by the user-adjustable control, a user indication of the desired level of brightness of the target region; and responsive to the user indication, adjusting the local brightness exposure level of the target region in the image based on a bilateral grid adjustment by:

applying a machine learning model to generate a first bilateral grid for the target region, applying the machine learning model to generate a second bilateral grid for a portion of the image outside the target region, and wherein the bilateral grid adjustment is based on a combination of the first bilateral grid and the second bilateral grid.

* * * * *